(12) United States Patent
Kaman et al.

US 11,316,835 B2
Apr. 26, 2022

(54) SYSTEMS AND METHODS FOR SECURING COMMUNICATIONS

(71) Applicant: Virtual Software Systems, Inc., Burlington, MA (US)

(72) Inventors: Charles H. Kaman, Lincoln, MA (US); Richard D. Fiorentino, Carlisle, MA (US)

(73) Assignee: Virtual Software Systems, Inc., Burlington, MA (US)

( * ) Notice: Subject to any disclaimer, the term of this patent is extended or adjusted under 35 U.S.C. 154(b) by 224 days.

(21) Appl. No.: 16/450,938

(22) Filed: Jun. 24, 2019

(65) Prior Publication Data

US 2019/0394022 A1  Dec. 26, 2019

Related U.S. Application Data

(60) Provisional application No. 62/833,988, filed on Apr. 15, 2019, provisional application No. 62/689,379, filed on Jun. 25, 2018.

(51) Int. Cl.
*H04L 9/32* (2006.01)
*H04L 9/06* (2006.01)
(Continued)

(52) U.S. Cl.
CPC ........ *H04L 63/0428* (2013.01); *H04L 9/0631* (2013.01); *H04L 9/0819* (2013.01);
(Continued)

(58) Field of Classification Search
CPC . H04L 63/0428; H04L 9/0631; H04L 9/0819; H04L 9/0869; H04L 9/3073;
(Continued)

(56) References Cited

U.S. PATENT DOCUMENTS 6,094,484 A * 7/2000 Hall, Jr. ................... G06K 9/72
  380/28
7,155,610 B2  12/2006 Yamamichi et al.
(Continued)

OTHER PUBLICATIONS

International Search Report and Written Opinion for International Application No. PCT/US2019/038769 dated Apr. 6, 2018.
(Continued)

*Primary Examiner* — Mohammed Waliullah
(74) *Attorney, Agent, or Firm* — Wolf, Greenfield & Sacks, P.C.

(57) ABSTRACT

Techniques for securing communication. The techniques include using at least one device to perform method for encrypting input data using a cipher associated with a plurality of languages including a first language, the first language associated with a first set of ciphertext symbols, a first permutation for the first set, and a first partition for the first permutation. The method includes obtaining, from the input data, a first plaintext symbol; mapping the first plaintext symbol to a first ciphertext symbol using the cipher, the mapping including: identifying a first set of candidate ciphertext symbols using the first plaintext symbol, the first permutation, and the first partition; and identifying, at random, the first ciphertext symbol from the first set of candidate ciphertext symbols; and outputting the first ciphertext symbol.

16 Claims, 18 Drawing Sheets

(51) Int. Cl.
*H04L 9/08* (2006.01)
*H04L 9/30* (2006.01)
*H04L 29/06* (2006.01)

(52) U.S. Cl.
CPC .......... *H04L 9/0869* (2013.01); *H04L 9/3073* (2013.01); *H04L 9/3242* (2013.01)

(58) Field of Classification Search
CPC ... H04L 9/3242; H04L 9/0891; H04L 9/0662; H04L 9/12
See application file for complete search history.

(56) References Cited

U.S. PATENT DOCUMENTS

| | | | |
|---|---|---|---|
| 7,194,628 B1 | 3/2007 | Guthery | |
| 8,223,973 B2 | 7/2012 | Furukawa et al. | |
| 8,433,892 B2 | 4/2013 | Rane et al. | |
| 8,634,549 B2 | 1/2014 | Schneider | |
| 8,744,076 B2 | 6/2014 | Youn | |
| 8,762,743 B2 | 6/2014 | Cannon et al. | |
| 8,996,871 B2 | 3/2015 | Sandberg et al. | |
| 9,871,654 B2 | 1/2018 | Huang | |
| 10,069,805 B1 | 9/2018 | Carlson et al. | |
| 10,162,985 B1 | 12/2018 | Carlson et al. | |
| 10,333,696 B2 * | 6/2019 | Ahmed | H04L 9/006 |
| 2003/0108199 A1 | 6/2003 | Pinder et al. | |
| 2004/0174995 A1 * | 9/2004 | Singh | H04L 9/302 380/30 |
| 2005/0149739 A1 | 7/2005 | Hopkins | |
| 2008/0013720 A1 | 1/2008 | Degele | |
| 2010/0211787 A1 | 8/2010 | Bukshpun et al. | |
| 2010/0257368 A1 | 10/2010 | Yuen | |
| 2011/0243320 A1 | 10/2011 | Halevi et al. | |
| 2012/0254612 A1 | 10/2012 | Rane et al. | |
| 2013/0103945 A1 | 4/2013 | Cannon et al. | |
| 2013/0138955 A1 | 5/2013 | Darcy | |
| 2014/0334622 A1 | 11/2014 | Smyth et al. | |
| 2015/0033014 A1 | 1/2015 | McGrew et al. | |
| 2016/0219024 A1 | 7/2016 | Verzun et al. | |
| 2017/0149815 A1 * | 5/2017 | Bolgert | H04L 63/1425 |
| 2019/0394171 A1 | 12/2019 | Kaman et al. | |
| 2021/0036856 A1 | 2/2021 | Wang et al. | |

OTHER PUBLICATIONS

Invitation to Pay Additional Fees for International Application No. PCT/US2019/038769 dated Aug. 15, 2019.

Bellare et al., Symmetric Encryption. In Introduction to Modern Cryptography. May 11, 2005; 33 pages.

Bellare et al., Authenticated Encryption in SSH: Provably Fixing the SSH Binary Packet Protocol. Proceedings of the 9th ACM conference on Computer and communications security. 2002:1-31.

Black, Authenticated encryption. In: van Tilborg H.C.A. (eds) Encyclopedia of Cryptography and Security. 2005 Springer, Boston, MA. Aug. 19, 2004; 12 pages.

Xiao et al., Secure Wireless Communication with Dynamic Secrets. 2010 Proceedings IEEE Infocom. IEEE, 2010:9 pages.

* cited by examiner

SYSTEMS AND METHODS FOR SECURING COMMUNICATIONS

CROSS-REFERENCE TO RELATED APPLICATIONS

The present application claims the benefit under 35 U.S.C. § 119(e) of U.S. Provisional Application No. 62/689,379, filed on Jun. 25, 2018, entitled "SYSTEMS AND METHODS FOR AUTHENTICATED ENCRYPTION,", and of U.S. Provisional Application No. 62/833,988, filed on Apr. 15, 2019, entitled "SYSTEMS AND METHODS FOR SECURING COMMUNICATIONS,", each which is incorporated by reference herein in its entirety.

BACKGROUND

Cryptographic techniques may be used to protect communication systems. For instance, encryption techniques based on symmetric cryptography and asymmetric cryptography may be used to protect confidentiality, while signature techniques based on asymmetric cryptography, as well as hashing techniques, may be used to protect integrity.

Symmetric cryptography may be less computationally intensive than asymmetric cryptography, and therefore may be more suitable for applications that operate in resource-constrained environments (e.g., mobile device, Internet-of-Things devices, etc.) and/or have high performance expectations (e.g., real time audio/video streaming). However, symmetric cryptography may become vulnerable to cryptanalysis attacks if the same symmetric key is repeatedly used to encrypt messages. For instance, by capturing and analyzing ciphertext from different messages, an attacker may be able to detect patterns and recover some or all of the corresponding plaintext.

SUMMARY

Some embodiments are directed to at least one non-transitory computer-readable storage medium storing processor-executable instructions that, when executed by at least one device, cause the at least one device to perform a method of encryption. The method comprises selecting a first operation from a plurality of operations, each of the plurality of operations associated with a respective type of data to be encrypted; generating first data to be encrypted at least in part by performing the first operation; encrypting both information identifying the first operation and the first data to obtain corresponding first ciphertext; and outputting the first ciphertext.

Some embodiments are directed to a method of encryption, the method comprising using at least one processor to perform: selecting a first operation from a plurality of operations, each of the plurality of operations associated with a respective type of data to be encrypted; generating first data to be encrypted at least in part by performing the first operation; encrypting both information identifying the first operation and the first data to obtain corresponding first ciphertext; and outputting the first ciphertext.

Some embodiments are directed to a system, the system comprising at least one processor and at least one non-transitory computer-readable storage medium storing processor-executable instructions that, when executed by the at least one processor, cause the at least one processor to perform a method of encryption. The method comprises selecting a first operation from a plurality of operations, each of the plurality of operations associated with a respective type of data to be encrypted; generating first data to be encrypted at least in part by performing the first operation; encrypting both information identifying the first operation and the first data to obtain corresponding first ciphertext; and outputting the first ciphertext.

In some embodiments, each operation of the plurality of operations is associated with a respective probability of a plurality of probabilities, and selecting the first operation comprises: selecting the first operation from the plurality of operations using the plurality of probabilities.

In some embodiments, the plurality of operations includes an operation for obtaining at least a portion of an input message to be output, an operation for obtaining a salt value, and an operation for changing the state of the at least one device.

In some embodiments, the first operation is an operation for changing the state of the at least one device, and performing the first operation causes at least one parameter in the state of the at least one device to be updated.

In some embodiments, the method comprises using a software program to perform the selecting, generating, encrypting and outputting acts, and wherein executing the first operation causes at least one parameter in the state of the software program to be updated.

In some embodiments, encrypting the first data is performed using an encryption module having at least one parameter, and performing the first operation causes at least one parameter of the encryption module to be updated.

In some embodiments, performing the first operation comprises changing at least one probability for selecting an operation from the plurality of operations.

In some embodiments, generating the first data comprises generating information indicating at least one update to the at least one parameter in the state of the at least one device, and encrypting the first data comprises encrypting the information indicating the at least one update to the at least one parameter.

In some embodiments, when the first operation is an operation for obtaining a salt value, generating the first data comprises obtaining a first salt value, and encrypting the first data comprises encrypting the first salt value.

In some embodiments, obtaining the first salt value comprises determining a target length of the salt using one or more sources of randomness; and generating, as the first salt value, a value having the target length using the one or more sources of randomness.

In some embodiments, the one or more sources of randomness include information associated with one or more of the plurality of operations previously performed by the at least one computing device.

In some embodiments, when the first operation is an operation for obtaining at least a part of input data to be encrypted, generating the first data comprises obtaining a first portion of an input message to be transmitted; and encrypting the first data comprises encrypting the first portion of the input message.

In some embodiments, encrypting the first data comprises encrypting the first data using a block cipher, a stream cipher, a substitution cipher, a polyalphabetic cipher, a public key encryption algorithm, and/or a symmetric-key encryption algorithm.

In some embodiments, the at least one parameter of the encryption module comprises a symmetric key, an initialization vector for a block cipher, an initialization vector for a stream cipher, and/or a substitution alphabet for a polyalphabetic cipher.

In some embodiments, encrypting the first data comprises encrypting the first data using a randomized partitioned permutation cipher.

In some embodiments, the randomized partitioned permutation cipher is associated with a plurality of languages including a first language; and after outputting the first ciphertext and before selecting a second operation from the plurality of operations, the method further comprises selecting a second language from the plurality of languages.

In some embodiments, the state of the encryption module includes one or more parameters specifying a permutation of a set of ciphertext symbols and one or more parameters specifying a partition of the permutation.

In some embodiments, updating the at least one parameter using at least one random value obtained from one or more sources of randomness.

In some embodiments, the method further comprises: transforming the first data after it is generated to obtain transformed first data, and encrypting the first data comprises encrypting the transformed first data.

In some embodiments, transforming the first data is performed using one or more random values obtained using one or more sources of randomness.

In some embodiments, the method further comprises transforming the first ciphertext to obtained transformed ciphertext, and transmitting the first ciphertext comprises transmitting the transformed ciphertext.

In some embodiments, outputting the first ciphertext comprises transmitting the first ciphertext to an another device via a communication channel. In some embodiments, outputting the first ciphertext comprises storing the first ciphertext in a memory.

Some embodiments are directed to a method for decrypting received ciphertext at a decryption device, the method comprising using the decryption device to perform: obtaining a first ciphertext; decrypting the first ciphertext to obtain corresponding first plaintext; identifying, from the first plaintext, a first operation of a plurality of operations, wherein the first operation is an operation for changing a state of the decryption device; and performing the first operation to change the state of the decryption device.

Some embodiments are directed to a system comprising at least one processor and at least one non-transitory computer-readable storage medium storing instructions that, when executed by the at least one processor, cause the at least one processor to perform a method for decrypting received ciphertext at a decryption device, the method comprising using the decryption device to perform: obtaining a first ciphertext; decrypting the first ciphertext to obtain corresponding first plaintext; identifying, from the first plaintext, a first operation of a plurality of operations, wherein the first operation is an operation for changing a state of the decryption device; and performing the first operation to change the state of the decryption device.

Some embodiments are directed to at least one non-transitory computer-readable storage medium storing instructions that, when executed by at least one processor, cause the at least one processor to perform a method for decrypting received ciphertext at a decryption device, the method comprising using the decryption device to perform: obtaining a first ciphertext; decrypting the first ciphertext to obtain corresponding first plaintext; identifying, from the first plaintext, a first operation of a plurality of operations, wherein the first operation is an operation for changing a state of the decryption device; and performing the first operation to change the state of the decryption device.

In some embodiments, the method for decrypting comprises using a software program including a decryption module to perform the obtaining, decrypting, identifying, and performing, and wherein performing the first operation comprises changing at least one value of at least one parameter of a decryption module using information in the first plaintext.

In some embodiments, the method for decrypting further comprises using the decryption device to perform: identifying, from the first plaintext, a second operation of the plurality of operations, wherein the second operation is an operation for obtaining a portion of an input message to be transmitted, and wherein performing the first operation comprises obtaining the portion of the input message from the first plaintext.

Some embodiments are directed to a method for encrypting input data using a cipher associated with a plurality of languages including a first language, the first language associated with a first set of ciphertext symbols, a first permutation for the first set, and a first partition for the first permutation. The method comprises using at least one processor to perform: obtaining, from the input data, a first plaintext symbol; mapping the first plaintext symbol to a first ciphertext symbol using the cipher, the mapping comprising: identifying a first set of candidate ciphertext symbols using the first plaintext symbol, the first permutation, and the first partition; and identifying, at random, the first ciphertext symbol from the first set of candidate ciphertext symbols; and outputting the first ciphertext symbol.

Some embodiments are directed to at least one non-transitory computer-readable storage medium storing processor-executable instructions that, when executed by at least one computing device, cause the at least one computing device to perform a method for encrypting input data using a cipher associated with a plurality of languages including a first language, the first language associated with a first set of ciphertext symbols, a first permutation for the first set, and a first partition for the first permutation. The method comprises using at least one processor to perform: obtaining, from the input data, a first plaintext symbol; mapping the first plaintext symbol to a first ciphertext symbol using the cipher, the mapping comprising: identifying a first set of candidate ciphertext symbols using the first plaintext symbol, the first permutation, and the first partition; and identifying, at random, the first ciphertext symbol from the first set of candidate ciphertext symbols; and outputting the first ciphertext symbol.

Some embodiments are directed to a system, comprising at least one computer hardware processor; and at least one non-transitory computer-readable storage medium storing processor-executable instructions that, when executed by at least one computing device, cause the at least one computing device to perform a method for encrypting input data using a cipher associated with a plurality of languages including a first language, the first language associated with a first set of ciphertext symbols, a first permutation for the first set, and a first partition for the first permutation. The method comprises using the at least one processor to perform: obtaining, from the input data, a first plaintext symbol; mapping the first plaintext symbol to a first ciphertext symbol using the cipher, the mapping comprising: identifying a first set of candidate ciphertext symbols using the first plaintext symbol, the first permutation, and the first partition; and identifying, at random, the first ciphertext symbol from the first set of candidate ciphertext symbols; and outputting the first ciphertext symbol.

In some embodiments, the method comprises: selecting the first language from the plurality of languages before mapping the first plaintext symbol to the first ciphertext symbol.

In some embodiments, selecting the first language comprises: generating the first permutation for the first set using one or more sources of randomness; and generating the first partition for the first permutation.

In some embodiments, generating the first partition for the first permutation comprises: identifying a set of active ciphertext symbols among the first set of ciphertext symbols; and identifying, as the first partition, multiple mutually disjoint proper subsets of the set of active ciphertext symbols, wherein the multiple proper subsets cover the set of active ciphertext symbols. In some embodiments, selecting the first language further comprises: generating a first decryption vector using the first permutation and the first partition.

In some embodiments, the method comprises: using the decryption vector, mapping the first ciphertext symbol to the first plaintext symbol; and outputting the first plaintext symbol.

In some embodiments, the first partition comprises multiple mutually disjoint proper subsets of the first set of ciphertext symbols, and wherein each of the multiple proper subsets contains a same number of ciphertext symbols.

In some embodiments, the first partition comprises multiple mutually disjoint proper subsets of the first set of ciphertext symbols, and wherein at least two of the multiple proper subsets contain a different number of ciphertext symbols.

In some embodiments, the plurality of languages includes a second language associated with the first set of ciphertext symbols, a second permutation for the first set and different from the first permutation, and a second partition for the first permutation, the method further comprising: obtaining, from the input data, a second plaintext symbol; mapping the second plaintext symbol to a second ciphertext symbol using the randomized partitioned permutation cipher, the mapping comprising: identifying a second set of candidate ciphertext symbols using the second plaintext symbol, the second permutation, and the second partition; identifying, at random, the second ciphertext symbol randomly from the second set of candidate ciphertext symbols; and outputting the second ciphertext symbol.

In some embodiments, after outputting the first ciphertext symbol and before mapping the second plaintext symbol to a second ciphertext symbol, the method further comprising selecting the second language from the plurality of languages.

In some embodiments, outputting the first ciphertext symbol comprises transmitting the first ciphertext symbol to another device using a communication channel. In some embodiments, outputting the first ciphertext symbol comprises storing the first ciphertext symbol.

In some embodiments, the method comprises: when using the first language for mapping plaintext symbols to respective ciphertext symbols, mapping each of the plaintext symbols, including the first plaintext symbol, to respective ciphertext symbols only in a proper subset of the first set of ciphertext symbols.

Some embodiments are directed to a method for decrypting encrypted data, the encrypted data encrypted using a cipher associated with a plurality of languages including a first language, the first language associated with a first set of ciphertext symbols, a first permutation for the first set, and a first partition for the first permutation. The method comprises: obtaining, from the encrypted data, a first ciphertext symbol; obtaining a first decryption vector for the first language; mapping the first ciphertext symbol to a first plaintext symbol using the first decryption vector; and outputting the first plaintext symbol.

Some embodiments are directed to a system comprising at least one processor and at least one non-transitory computer-readable storage medium storing instructions that, when executed by the at least one processor, cause the at least one processor to perform a method for decrypting encrypted data, the encrypted data encrypted using a cipher associated with a plurality of languages including a first language, the first language associated with a first set of ciphertext symbols, a first permutation for the first set, and a first partition for the first permutation. The method comprises: obtaining, from the encrypted data, a first ciphertext symbol; obtaining a first decryption vector for the first language; mapping the first ciphertext symbol to a first plaintext symbol using the first decryption vector; and outputting the first plaintext symbol.

Some embodiments are directed to at least one non-transitory computer-readable storage medium storing instructions that, when executed by at least one processor, cause the at least one processor to perform a method for decrypting encrypted data, the encrypted data encrypted using a cipher associated with a plurality of languages including a first language, the first language associated with a first set of ciphertext symbols, a first permutation for the first set, and a first partition for the first permutation. The method comprises: obtaining, from the encrypted data, a first ciphertext symbol; obtaining a first decryption vector for the first language; mapping the first ciphertext symbol to a first plaintext symbol using the first decryption vector; and outputting the first plaintext symbol.

In some embodiments the method for decrypting encrypted data further includes: identifying a subset of active ciphertext symbols among the first set of ciphertext symbols; and detecting tampering at least in part by determining whether the first ciphertext symbol is in the active subset.

The foregoing is a non-limiting summary of the invention, which is defined by the attached claims.

BRIEF DESCRIPTION OF DRAWINGS

Various aspects and embodiments will be described with reference to the following figures. It should be appreciated that the figures are not necessarily drawn to scale.

DETAILED DESCRIPTION

Figure 1:
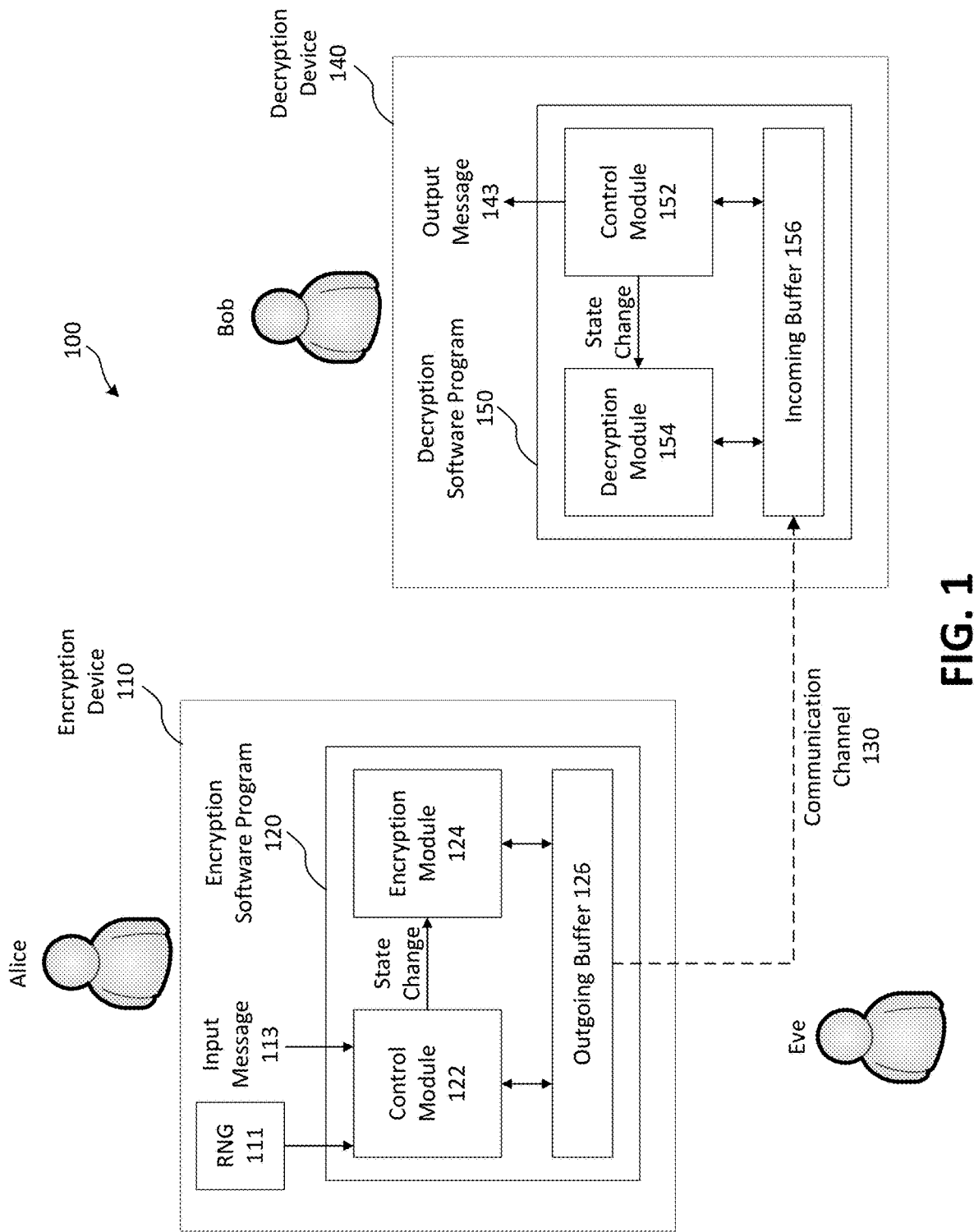
FIG. 1 shows an illustrative communication system 100, in accordance with some embodiments of the technology described herein.

The inventors have recognized and appreciated that many conventional techniques for securing communications may be compromised because they are static in that they rely on encryption (and decryption) methods that repeatedly use the same parameters for encrypting (and decrypting) different communications at different times. For example, some conventional techniques for securing communications involve performing symmetric key encryption using the same symmetric key across multiple communications over a period of time (e.g., minutes, days, weeks, etc.). This approach is vulnerable to cryptanalysis attacks, as an attacker may be able to detect patterns in the ciphertext and thereby recover or alter some or all of the corresponding plaintext without being detected, for example, by determining the symmetric key used for encryption. Once a symmetric key is compromised, so are any past or future communications encrypted with the key. Similarly, if a malicious third party were to determine any other parameters used by the encryption software to encrypt data, the third party would be able to determine and/or modify some or all of the information being transmitted, thereby compromising security.

To address the above-described problem with conventional static techniques for securing communications, the inventors have developed dynamic secure communication techniques that involve dynamically updating one or more parameters (e.g., a symmetric key) used for encryption and decryption, instead of repeatedly using the same parameters. The inventors have recognized and appreciated that dynamically refreshing encryption parameters (e.g., at random times) would increase the security of communications, as their susceptibility to cryptanalysis techniques would be substantially reduced or eliminated. Accordingly, the inventors have developed techniques for generating dynamic changes at an encryption device, and for communicating such changes from the encryption device to a decryption device, so that the decryption device can make corresponding changes and stay synchronized with the encryption device.

The inventors have also recognized and appreciated that many conventional symmetric and asymmetric encryption techniques used to secure communications depend on fixed algorithms, including one-way functions, and that increases in computing power and techniques (e.g., quantum computing) put the integrity of these fixed algorithms at risk. In some embodiments, the use of polyalphabetic cipher techniques combined with probabilistically driven changes to the operating parameters, data structures, and order of execution of the software program add additional entropy and thereby increase the complexity and cost of an attacker's efforts to compromise communications.

Accordingly, some embodiments provide for a method comprising using an encryption device to perform: (1) selecting a first operation from a plurality of operations, each of the plurality of operations associated with a respective type of data to be encrypted (e.g., a portion of the input message, a command, a salt, etc.); (2) generating first data to be encrypted by performing the first operation; (3) encrypting both: (a) information identifying the first operation (e.g., information indicating the command executed, such as an opcode, to perform the first operation), and (b) the first data to obtain corresponding first ciphertext; and (4) outputting the first ciphertext (e.g., sending the ciphertext, via a communication channel such as the Internet, to another device, and/or writing the ciphertext to memory for later decryption). In some embodiments, the encryption device may use a software program having one or more parameters representing a state to perform the acts of selecting generating, encrypting, and outputting. Alternately, one or more of these acts may be implemented using hardware. Accordingly, the techniques described herein may be implemented using software, hardware, or any suitable combination thereof.

The inventors have recognized and appreciated that randomly selecting operations to be encrypted may improve security of an encryption method. To facilitate randomly selecting an operation, in some embodiments, the plurality of operations may be associated with a respective plurality of probabilities. Selecting a first operation at random may include using the respective plurality of probabilities to probabilistically select the first operation. The plurality of probabilities may be changed dynamically (e.g., at random times) during operation to reduce the predictability of the encryption method.

In some embodiments, the plurality of operations may include an operation for obtaining at least a part of input data to be encrypted, an operation for obtaining a salt value, and an operation for changing the state of the encryption device.

In some embodiments, when the first operation is an operation for obtaining at least a part of input data (e.g., a message to be transmitted) to be encrypted, generating the first data comprises obtaining a first portion of the input data to be encrypted. Encrypting the first data may then comprise encrypting the first portion of the input data.

In some embodiments, when the first operation is an operation for obtaining a salt value, generating the first data comprises obtaining a first salt value, and encrypting the first data comprises encrypting the first salt value. Obtaining the salt value may comprise setting a desired length of the salt using one or more sources of randomness, and generating a salt value having the desired length using one or more sources of randomness (e.g., a random number generator, information associated with one or more of the previously executed plurality of operations, etc.).

In some embodiments, when the first operation is an operation for changing the state of the encryption device, generating the first data may comprise generating information indicating one or more changes to one or more values of the one or more parameters in the state of the encryption device. Additionally, encrypting the first data may comprise encrypting the information indicating the one or more changes to the values of the one or more parameters in the state of the encryption device.

The inventors have recognized and appreciated that unpredictably and dynamically making changes to the state of an encryption device for encryption may further improve the security of the encryption. In some embodiments, changing the state of the encryption device may comprise changing one or more values of one or more respective parameters of the encryption device (e.g., one or more parameters of encryption software running on the encryption device, one or more parameters accessed by circuitry of the encryption device, etc.).

In some embodiments, the state of the encryption device may be changed by combining the one or more values of the one or more current parameters with one or more random values obtained from one or more sources of randomness (e.g., a random number generator, previously executed operations). Combining the one or more values of the one or more parameters with one or more random values may comprise using a rotation operation, an exclusive OR operation, a modular addition operation, a binary logic operation, and/or any other suitable type of operation.

Encrypting the first data to obtain corresponding first ciphertext, in some embodiments, comprises using an encryption module of the software program. Encrypting the first data correspondingly may comprise encrypting the first data using an encryption technique (e.g., a block cipher, a stream cipher, a substitution cipher, a polyalphabetic cipher, a public key encryption algorithm, symmetric-key encryption algorithm, and/or any suitable encryption algorithm). The encryption module may additionally comprise a state, which includes one or more parameters. These parameters may include, for example, a symmetric key, an initialization vector for a block cipher, an initialization vector for a stream cipher, a message authentication code (MAC), and/or a substitution alphabet for a polyalphabetic cipher. As discussed above, when the first operation is an operation for changing a state of the software program, the state of the encryption module may be changed.

The inventors have further recognized and appreciated that performing certain types of transformations (e.g., whitening transformations) on the plaintext before encryption and/or the ciphertext obtained as a result of the encryption may decrease correlation between ciphertext and one or more other observables (e.g., plaintext message, device characteristics, etc.) and improve security of the encryption. Such transformations may increase the complexity and cost of side-channel attacks. For example, such transformations may decorrelate the physical operating characteristics of the hardware (e.g., power consumption, electromagnetic emissions, temperature, etc.) from the operation of the software program. Transformations may be performed using one or more random values obtained from a random number generator and/or one or more of the plurality of operations previously executed by the encryption device. A transformation may be applied to the first data after it is generated to obtain transformed first data such that encrypting the first data comprises encrypting the transformed first data. A transformation may be applied to the first ciphertext prior to outputting the first ciphertext such that the output first ciphertext is transformed ciphertext.

Some embodiments provide a method for decrypting ciphertext using a decryption device to perform: (1) obtaining a first ciphertext; (2) decrypting the first ciphertext to obtain corresponding first plaintext; (3) identifying, from the first plaintext, a first operation of a plurality of operations, wherein the first operation is an operation for changing a state of the decryption device (e.g., an operation for changing the state of decryption software executing on the decryption device); and (4) performing the first operation to change the state of the decryption device. In some embodiments, the decryption device may use a software program to perform the above-described acts of obtaining, decrypting, identifying, and performing. Alternately, one or more of these acts may be implemented using hardware. Accordingly, the encryption and decryption techniques described herein may be implemented using hardware, software, or any suitable combination thereof.

In some embodiments, a second operation may be identified from the plurality of operations. The second operation may be an operation for obtaining a portion of an input message to be output. Performing the first operation may comprise obtaining the portion of the input message from the first plaintext.

Decrypting the first ciphertext to obtain corresponding first plaintext, in some embodiments, comprises using a decryption module of the software program. The decryption module may comprise instructions for implementing a block cipher, a stream cipher, a substitution cipher, a polyalphabetic cipher, a public key encryption algorithm, a symmetric-key encryption algorithm, and/or any suitable encryption algorithms. The decryption module may include one or more parameters such as, for example, a symmetric key, an initialization vector for a block cipher, an initialization vector for a stream cipher, and/or a substitution alphabet for a polyalphabetic cipher. The values of these parameters may be changed so that the decryption device remains synchronized with the encryption device.

While the dynamic secure communication techniques described herein may be used with any cipher (e.g., Advanced Encryption Standard (AES), Rivest-Shamir-Adleman (RSA), etc.), the inventors have also developed a new cipher for use in the dynamic secure communication techniques described herein. The new cipher developed by the inventors may be referred to herein as a randomized partitioned permutation cipher (RPPC).

In some embodiments, an RPPC may be a polyalphabetic cipher associated with a plurality of languages, each language being associated with a set of ciphertext symbols, a permutation for the set of ciphertext symbols, and a partition for the permutation. The RPPC may be used to map plaintext symbols to ciphertext symbols using one or multiple languages. A single language is used to encode a plaintext symbol to obtain a corresponding ciphertext symbol. However, in some embodiments, different languages may be used to map different plaintext symbols to corresponding ciphertext symbols. As such, the RPPC may be considered as a probabilistic polyalphabetic cipher, with the underlying languages being changed at random times.

In some embodiments, for a given language, mapping a plaintext symbol to a ciphertext symbol may involve performing: (1) obtaining, from the input data, a first plaintext symbol; (2) mapping the first plaintext symbol to a first ciphertext symbol using the cipher, the mapping comprising: (a) identifying a first set of candidate ciphertext symbols using the first plaintext symbol, the first permutation, and the first partition; and (b) identifying, at random, the first ciphertext symbol from the first set of candidate ciphertext symbols; and (3) outputting the first ciphertext symbol (e.g., transmitting the first ciphertext symbol via a communication channel, storing the first ciphertext symbol in memory, etc.).

In some embodiments, a language to be used for encryption may be selected from the plurality of languages before mapping the first plaintext symbol to the first ciphertext symbol. In some embodiments, selecting the first language may comprise obtaining (e.g., generating using a source of randomness or accessing) the first permutation for the first set, obtaining (e.g., generating using a source of randomness or accessing) the first partition for the first permutation, and/or obtaining (e.g., generating or accessing) a first decryption vector corresponding to the first permutation and the first partition. The first partition may associate each ciphertext symbol in the first set of ciphertext symbols with one of multiple subsets of the first set of ciphertext symbols. The multiple subsets may be mutually disjoint, and a union of the multiple subsets may include the first set of ciphertext symbols. Multiple subsets may each contain a same number of ciphertext symbols, or multiple subsets may each contain a different number of ciphertext symbols.

In some embodiments, the plurality of languages may include a second language associated with the first set of ciphertext symbols, a second permutation for the first set and different from the first permutation, and a second partition for the first permutation. Accordingly, some embodiments provide for a method further comprising: (1) obtaining, from the input data, a second plaintext symbol; (2) mapping the second plaintext symbol to a second ciphertext symbol using the randomized partitioned permutation cipher, the mapping comprising: (a) identifying a second set of candidate ciphertext symbols using the second plaintext symbol, the second permutation, and the second partition; (b) identifying, at random, the second ciphertext symbol randomly from the second set of candidate ciphertext symbols; and (3) outputting the second ciphertext symbol. The method may comprise selecting the second language from the plurality of languages after outputting the first ciphertext symbol and before mapping the second plaintext symbol to a second ciphertext symbol.

The inventors have recognized and appreciated that performing a transformation (e.g., whitening, renaming, and/or assigning) on the first ciphertext symbol after outputting the first ciphertext symbol and before transmitting the first ciphertext symbol may improve security of the cipher developed by the inventors. Accordingly, a method is provided for storing previous ciphertext symbols output by an encryption algorithm and combining the first ciphertext symbol with one or more previously stored ciphertext symbols.

Some embodiments provide for a method of decrypting ciphertext using a cipher and at least one computer hardware processor to perform: (1) obtaining, from the encrypted data, a first ciphertext symbol; (2) obtaining a first decryption vector for the first language; (3) mapping the first ciphertext symbol to a first plaintext symbol using the first decryption vector; and (4) outputting the first plaintext symbol.

As described above, the inventors have further recognized and appreciated that security of communications may be improved by providing methods for detecting tampering (e.g., with the encryption device, the communication channel, etc.).

In some embodiments, tamper detection may be facilitated by: (1) using only a subset of potential ciphertext symbols to represent plaintext symbols at the encryption side; and (2) detecting tampering if any ciphertext symbols not in that subset are detected at the decryption side. For example, in some embodiments, tamper detection may be provided by identifying a subset of active ciphertext symbols among the first set of ciphertext symbols, such that only ciphertext symbols of the subset of active ciphertext symbols should appear in a transmitted stream of ciphertext. In turn, tampering may be detected at least in part by determining whether the ciphertext symbols received over the communication channel are in the active subset of ciphertext symbols. For example, detecting a ciphertext symbol not in the active subset at the decoding device may indicate that tampering has occurred (e.g., at the encryption device, on the communication channel, etc.).

It should be appreciated that the techniques described herein may be implemented in any of numerous ways, as the techniques are not limited to any particular manner of implementation. Examples of details of implementation are provided herein solely for illustrative purposes. Furthermore, the techniques disclosed herein may be used individually or in any suitable combination, as aspects of the technology described herein are not limited to the use of any particular technique or combination of techniques.

FIG. 1 shows an illustrative communication system 100, in accordance with some embodiments. In this example, the communication system 100 includes an encryption device 110 configured to communicate with a decryption device 140 via a communication channel 130. In some embodiments, the encryption device 110 may be implemented in hardware, in software, or using any suitable combination thereof. For example, in some embodiments, the encryption device 110 may be implemented entirely or at least in part using an Application Specific Integrated Circuit (ASIC), a Field-Programmable Gate Array (FPGA), and/or any other suitable type of circuitry. As another example, in some embodiments, the encryption device 110 may be implemented by programming one or more computer hardware processors to perform the functionality described herein. For example, in some embodiments, encryption device 110 may be configured to implement an encryption software program 120 to perform one or more functions of the encryption device 110.

Similarly, in some embodiments, the decryption device 140 may be implemented in hardware, in software, or using any suitable combination thereof. For example, in some embodiments, the decryption device 140 may be implemented entirely or at least in part using an Application Specific Integrated Circuit (ASIC), a Field-Programmable Gate Array (FPGA), and/or any other suitable type of circuitry. As another example, in some embodiments, the decryption device 140 may be implemented by programming one or more computer hardware processors to perform the functionality described herein. For example, in some embodiments, decryption device 140 may be configured to implement a decryption software program 150 to perform one or more functions of the decryption device 140.

In some embodiments, the encryption device 110 may receive an input message 113 from a first user (e.g., Alice) or a first software application (not shown), encrypt the input message 113 into a ciphertext message using an encryption software program 120, and transmit the ciphertext message over the communication channel 130 to the decryption device 140. The decryption device 140 may decrypt the ciphertext message using a decryption software program 150 into an output message 143, and provide the output message 143 to a second user (e.g., Bob) or a second software application (not shown).

In some embodiments, the communication channel 130 may be established using one or more wired links, one or more wireless links, and/or any suitable combination thereof. Communication channel 130 may be established over one or more public and/or private networks (e.g., Internet, a corporate Intranet, a local area network, a wide area network, etc.).

In addition to, or instead of, sending information over communication channel 130, encryption device 110 may store information in a data store (e.g., a database, memory, cloud storage, etc.). In some such embodiments, decryption device 140 may be configured to access information from the data store.

In some embodiments, an eavesdropper (e.g., Eve) may be able to read, delete, insert, and/or modify data transmitted over the communication channel 130. For instance, the eavesdropper may be able to intercept and/or spoof packets sent by the encryption device 110 to the decryption device 140 over a network. Additionally, or alternatively, the eavesdropper may have access to a data store shared by the encryption device 110 and the decryption device 140.

In some embodiments, the encryption software program 120 may include a control module 122. In some embodiments, control module 122 may select, from a plurality of operations, an operation which is to be performed by encryption software program 120. For example, control module 122 may select an operation from one of a plurality of operations including, but not limited to, (1) an operation for obtaining at least a portion of an input message to be output (e.g., encrypted and transmitted over communication channel 130 or encrypted and stored in a data store), (2) an operation for obtaining a salt value (e.g., an operation for obtaining multiple random bits to be encrypted and transmitted over communication channel 130 or encrypted and stored in a datastore), and (3) an operation for changing the state of the encryption device 110 (e.g., an operation for changing one or more parameter values of encryption software 120 executing on the encryption device 110). For brevity, these three operations may be referred to herein as "input", "salt", and "change state" operations.

In some embodiments, control module 122 may select one of multiple operations to be performed using input from one or more sources of randomness (e.g., random number generator 111). For example, in some embodiments, control module 122 may select one of a plurality of operations to be performed using a respective plurality of probability values such that each operation is chosen with a probability specified by its respective probability value.

For example, when control module 122 selects "input" as the operation to be performed by encryption software program 120, control module 122 may obtain a portion (e.g., one or more symbols and/or characters) of input message 113 and send the obtained portion to encryption module 124 for encryption, or cause these acts to occur. Subsequently, the encrypted message portion together with encrypted information indicating that the "input" operation was performed, may be transmitted over communication channel 130 and/or stored in a data store.

As another example, when control module 122 selects "salt" as the operation to be performed by encryption software program 120, control module 122 may obtain a salt comprising one or more random values. In some embodiments, control module 122 may determine a target length of the salt using input using one or more sources of randomness (e.g., random number generator 111), then generate a salt value having the target length using input from the source(s) of randomness, and send the generated salt to encryption module 124 for encryption (or cause these acts to occur). Subsequently, the encrypted salt together with encrypted information indicating that the "salt" operation was performed, may be transmitted over communication channel 130 and/or stored in a data store.

As yet another example, when control module 122 selects "change state" as the operation to be performed by encryption software program 120, control module 122 may change the state of the encryption device 110. This may be achieved, for example, by changing one or more parameters of the encryption software program and/or of the encryption device (e.g., a symmetric key used to encrypt and decrypt data, one or more parameters of the RPPC, the probability values for selecting from among the operations, an initialization vector for a block or a stream cipher, a substitution alphabet for a polyalphabetic cipher, etc.). Control module 122 may send, to the encryption module 124, the new parameter values and may change the state of the encryption device 110 using the new parameter values (or cause these acts to occur). Subsequently, the encrypted parameter values together with encrypted information indicating that the "change state" operation was performed, may be transmitted over communication channel 130 and/or stored in a data store.

As shown in FIG. 1, in some embodiments, the control module 122 may receive input from a random number generator (RNG) 111 or other entropy source. This input may be used to inject new randomness into the encryption process performed by encoding device 110, for example, as described below in connection with FIG. 2A. However, aspects of the present disclosure are not limited to the control module 122 receiving input from one or more random number generators. In some embodiments, the control module 122 may itself include a random number generator, which may use one or more entropy sources such as measurements of thermal noise, cosmic radiation, etc. In some embodiments, the random number generator may include a pseudo random number generator seeded with a random input from an entropy source.

In some embodiments, the control module 122 may write one or more bits of the input message 113 and/or other information into an outgoing buffer 126 or cause these acts to occur. The control module 122 may invoke an encryption module 124 to encrypt content of the outgoing buffer 126 into ciphertext to be transmitted to (or stored for subsequent transmission to) the decryption device 140.

In some embodiments, the control module 122 may cause one or more state changes in the encryption module 124. Such state changes may change how future input messages are encrypted. In some embodiments, the control module 122 may cause a state change operation at random, and/or cause a state change at a randomly determined point in time.

In some embodiments, the control module 122 may write into the outgoing buffer 126 information indicating one or more state changes that the encryption module 124 is undergoing. This information may be encrypted by the encryption module 124, and/or transmitted to the decryption device 140 via the communication channel 130. At the decryption device 140, the decryption software program 150 may decrypt this information.

In some embodiments, the decryption software program 150 may include a control module 152. The control module 152 may invoke a decryption module 154 to decrypt incoming ciphertext stored in incoming buffer 156 and received from, for example, encryption device 110. The control module 152 may identify, from the decrypted ciphertext (herein, "plaintext") an operation (e.g., an "input" operation, a "salt" operation, or a "change state" operation) that was executed on the encryption device 110 and any information associated with the operation. The operation and associated information may then be used to synchronize the decryption device 140 with the encryption device 110.

For example, when control module 152 determines that the plaintext indicates that an "input" operation was performed at the encoder device 110, the control module 152 may identify a portion of the input message 113 in the plaintext and provide that portion as part of the output message 143 to the second user (e.g., Bob) or to a second software application (not pictured).

As another example, when control module 152 determines that the plaintext indicates than a "salt" operation was performed at the encoder device 110, the control module 152 may cause the decryption software program 150 to identify the transmitted salt value in the text and to disregard it as meaningless.

As yet another example, when control module 152 determines that the plaintext indicates that a "change state" operation was performed at the encoder device 110, the control module 152 may identify, in the plaintext, at least one new value of at least one parameter of the decryption device, and may update the value(s) of these parameters at the decryption device 140 accordingly. In this way, the encryption device 110 and the decryption device 140 may stay synchronized, as any updates to parameters of the encryption device 110 would be also made to the corresponding parameters of the decryption device 140. For example, if a symmetric key of a cipher were changed at the encryption device 110 to a new value, the new value of the key would be transmitted (in encrypted form) to the decryption device 140 and the symmetric key used by the decryption module 140 would be updated to reflect the new symmetric key.

In some embodiments, control modules 122 and 152 may be implemented using state machines or any other suitable type of finite state automata. However, aspects of the technology described herein are not limited in this respect, as control modules 122 and 152 may be implemented in any other suitable ways.

As shown in the example of FIG. 1, encryption software program 120 includes control module 122, encryption module 124, and outgoing buffer 126. However, it should be appreciated that in other embodiments, encryption software program 120 may include one or more other modules instead of or in addition to control module 122, encryption module 124, and outgoing buffer 126. For example, in some embodiments, encryption software program 120 may receive parameters from a different software program (e.g., instead of control module 122) and/or provide output to another software program (e.g., instead of to outgoing buffer 126).

As shown in the example of FIG. 1, decryption software program 150 includes control module 152, decryption module 154, and incoming buffer 156. It should also be appreciated that, in other embodiments, decryption software program 150 may include one or more other modules instead of or in addition to control module 152, decryption module 154, and incoming buffer 156. For example, in some embodiments, decryption software program 150 may receive parameters (e.g., control parameters from encryption device 110 (e.g., instead of control module 152) and/or provide output to another software program (e.g., instead of as an output message 143).

Also, as shown in the illustrative example of FIG. 1, encryption software program 120 receives random bits from a random number generator (RNG) 111. However, in other embodiments, encryption software program 120 may be configured to receive one or more random values from any suitable sources of randomness (sometimes termed "entropy sources"), as aspects of the technology described herein are not limited in this respect. For example, as described herein, in some embodiments, one or more random values may be obtained from historical information that indicates one or more operations (and, optionally, their parameters) that were previously executed by the encoding device 110.

It should also be appreciated that, although in the illustrative example of FIG. 1, the encryption device 110 and decryption device 140 are shown as separate devices, the technology described herein is not limited in this way. For example, in some embodiments, the encryption and decryption devices may be part of a same physical device. Such a combination, for example, may be used for securely storing data in a data store (e.g., a hard drive).

Figure 2A:
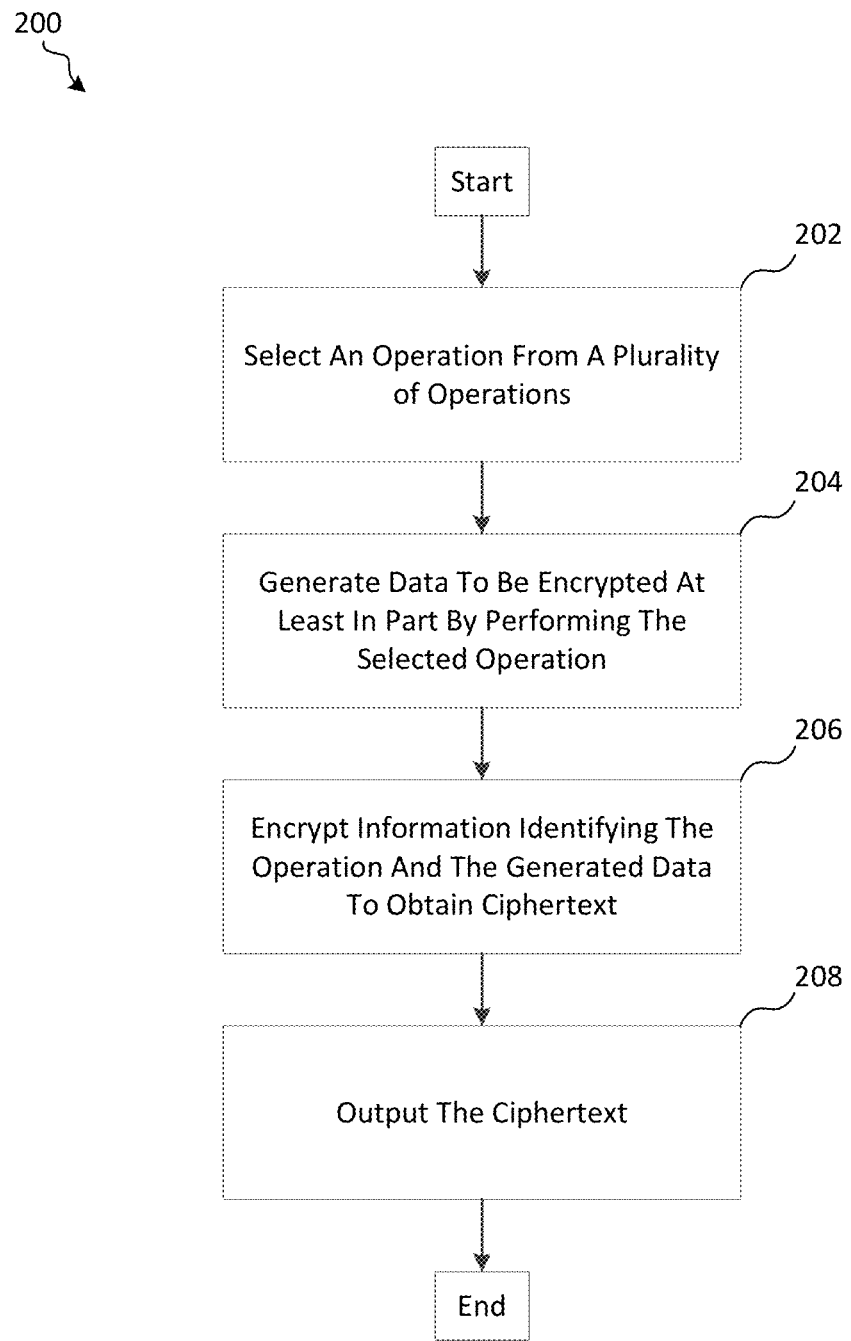
FIG. 2A shows an illustrative process 200 for randomized encryption, in accordance with some embodiments of the technology described herein.

FIG. 2A shows an illustrative process 200 for randomized encryption, in accordance with some embodiments of the technology described herein. For instance, the process 200 may be performed by encryption device 110 described with reference to FIG. 1. In some embodiments, the process 200 may be performed by hardware (e.g., using an ASIC, an FPGA, or any other suitable circuitry), software (e.g., by executing the software using a computer processor), or any suitable combination thereof.

At act 202, an operation may be selected from a plurality of operations. Examples of available operations include, but are not limited to, an operation for obtaining at least a portion of an input message to be output, an operation for obtaining a salt value, and an operation for changing the state of one or more of the encryption device, encryption software program and/or encryption module. The operation may be selected by a control module (e.g., illustrative control module 122 of FIG. 1).

In some embodiments, different probabilities may be associated with different operations, respectively. Such probabilities may be selected based on tradeoffs among security, energy consumption, throughput, etc. For instance, if a higher probability is assigned to a salt operation, more randomness may be injected, which may improve security, but may have lower throughput, and/or use more energy per unit length of input message. Alternately, or additionally, in some embodiments an operation may be selected based on input from one or more entropy sources (e.g., illustrative random number generator 111 of FIG. 1).

Next, process 200 proceeds to act 204, where data to be encrypted is generated at least in part by performing the operation selected at act 202. For example, generating the data to be encrypted may involve selection a portion of an input message (e.g., input message 113), when the operation selected at act 202 is an "input" operation. As another example, generating the data to be encrypted may involve generating a salt value, when the operation selected at act 202 is a "salt" operation. As yet another example, generating the data to be encrypted may involve generating one or more new parameter values for one or more parameters of the system and/or software performing the process 200, and setting the parameter(s) to have the new parameter value(s), when the operation selected at act 202 is the "change state" operation.

In some embodiments, performing an operation may include executing a command associated with that operation having the appropriate parameters. This is described herein, including with reference to FIG. 3.

Next, process 200 proceeds to act 206, where the data generated at act 204 is encrypted together with information identifying the operation selected at act 202 to obtain ciphertext. In some embodiments, the ciphertext generated in this way may be transmitted over a communication channel to a decryption device that, in turn, may decrypt the ciphertext and identify the operation performed. In this way, the decryption device may detect when any "change state" operations are performed at the encryption device and update its own state so as to remain synchronized with the encryption device.

In some embodiments, an encryption module (e.g., the illustrative encryption module 124 in the example of FIG. 1) may be invoked to encrypt the generated data to generate corresponding ciphertext at act 206. For example, when the selected operation is an operation for obtaining at least a portion of an input message, the generated data may be a portion of the input message that is read into the encryption module 124. The encryption module 124 may then encrypt the portion of the input message and information identifying the ciphertext as containing at least a portion of an input message. When the decryption device obtains the ciphertext, the decryption device may decrypt the ciphertext and determine from the information identifying the selected operation (which would be in the plaintext) that at least a portion of the input message was encrypted at the encryption device. In turn, the decryption device may then pass the at least a portion of the input message on (e.g., to another software program, to a user, etc.).

As another example, when the selected operation is an operation for obtaining a salt, the generated data may be a random value that is read into the encryption module 124. The encryption module 124 may then encrypt the random value and information indicating that the ciphertext contains a salt. When the decryption device obtains the ciphertext, the decryption device may decrypt the ciphertext and determine from the information identifying the selected operation (in the plaintext) that a random value was encrypted at the encryption device. In turn, the decryption device may then disregard the random value.

As yet another example, when the selected operation is an operation for changing the state of the encryption device, the generated data may be one or more new parameter values. Examples of such parameters are provided herein. The encryption module 124 may then encrypt information indicating which parameters were changed along with the new parameter values and information identifying that the "change state" operation was performed. When the decryption device obtains the ciphertext, the decryption device may decrypt the ciphertext and determine, from the plaintext, that the "change state" operation was performed at the encryption device and that the values of one or more particular parameters were modified. In turn, the decryption device may obtain the new parameter value(s) from the plaintext and set its corresponding parameters to the new value(s) such that the state of the decryption device mirrors the state of the encryption device, enabling secure communication between the two.

Next, process 200 proceeds to act 208, where the ciphertext generated at act 206 is output. For example, the ciphertext generated at act 206 may be transmitted to a remote device via a communication channel (e.g., to decryption device 140 via communication channel 130 shown in FIG. 1). As another example, the ciphertext generated at act 206 may be stored in a memory for subsequent access (e.g., for subsequent transmission or decryption). The process 200 may end, or may return to act 202 to select a next operation. The process 200 may be repeated any suitable number of times, as aspects of the technology described herein are not limited in this respect.

Figure 2B:
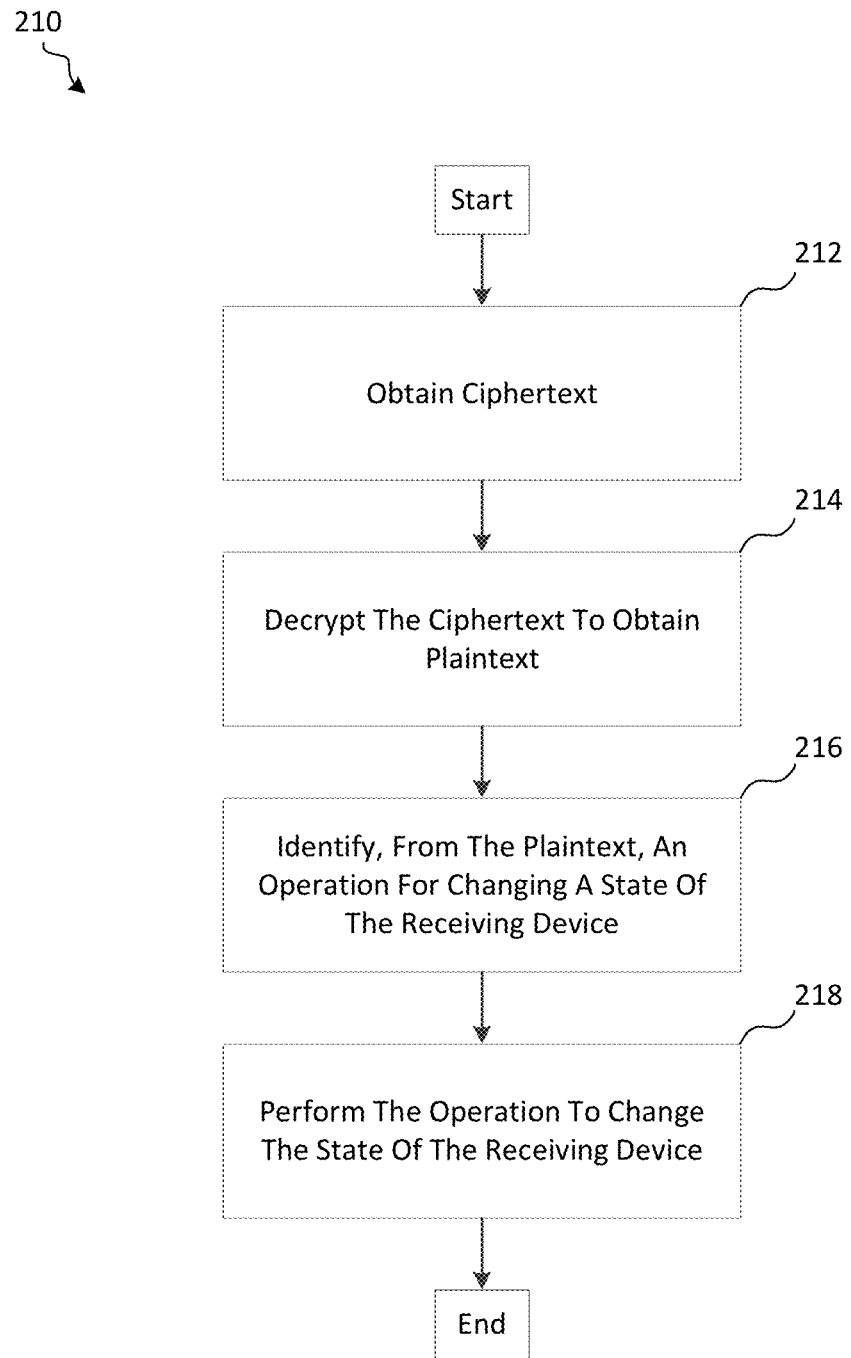
FIG. 2B shows an illustrative process 210 for randomized decryption, in accordance with some embodiments of the technology described herein.

FIG. 2B shows an illustrative process 210 for synchronized decryption, in accordance with some embodiments of the technology described herein. For instance, the process 210 may be performed by illustrative decryption device 140 shown in FIG. 1. In some embodiments, the process 210 may be performed by hardware (e.g., using an ASIC, an FPGA, or any other suitable circuitry), software (e.g., by executing the software using a computer processor), or any suitable combination thereof.

Process 210 begins at act 212, where ciphertext is obtained. In some embodiments, the ciphertext may be received from an encryption device (e.g., via illustrative communication channel 130). In some embodiments, the ciphertext may be read from a memory.

Next, process 212 proceeds to act 214, where the ciphertext obtained at act 210 is decrypted to obtain corresponding plaintext. In some embodiments, the obtained plaintext may include: (1) information indicating at least one operation performed by an encoding device (e.g., an "input" operation, a "salt" operation, and a "change state" operation); and (2) data generated by the encoding device as a result of performing the at least one operation.

For example, the obtained plaintext may include: (1) information indicating that the "input" operation was performed by the encoding device; and (2) a portion of an input message that was encrypted and transmitted by the encoding device. As another example, the obtained plaintext may include: (1) information indicating that the "salt" operation was performed by the encoding device; and (2) the salt value. As yet another example, the obtained plaintext may include: (1) information indicating that the "change state" operation was performed by the encoding device; and (2) new values for one or more parameters of the encoding device (examples of such parameters are provided herein).

The decryption device may perform different actions depending on which operation is indicated in the plaintext as having been performed on the encoding device. For example, if the "input" operation was performed, the decoding device may identify a portion of an input message in the plaintext and output it to a user (e.g., Bob) or another software application program as an output message (e.g., output message 143 of FIG. 1). As another example, if the "salt" operation was performed, the decoding device may identify a salt in the plaintext and discard it. As yet another example, if the "change state" operation was performed, the decoding device may obtain one or more new parameter values in the plaintext, and set the value(s) of its corresponding parameters to the new values to stay synchronized with the encoder device.

The acts 216-218 of illustrative process 210 describe one of the possible actions described above—in particular when a "change state" operation is identified in the plaintext obtained at act 214. In particular, at act 216, it is identified from the plaintext that a "change state" operation was performed by the encoder device. Subsequently, process 200 proceeds to act 218 where the state of the decoder device is updated with the new parameter values obtained in the plaintext. After acts 216-218 are completed, process 210 may return to act 212 so that additional ciphertext is processed.

It should be appreciated that although, in the illustrated process of FIG. 2B, the operation identified from the plaintext is the "change state" operation, any other operation may be identified from the plaintext including, but not limited to, the "salt" and "input" operations described herein.

Figure 3:
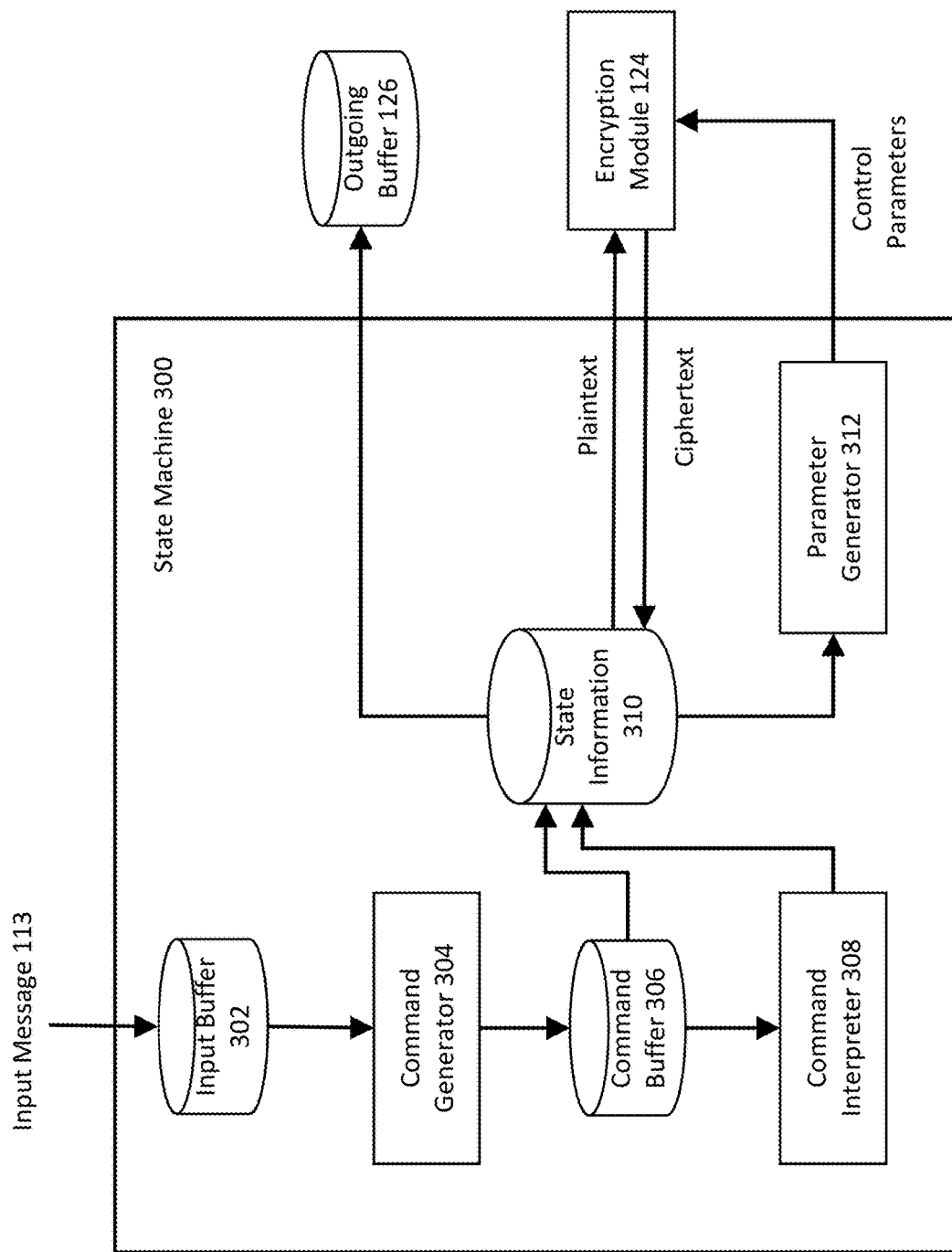
FIG. 3 shows an illustrative state machine 300, in accordance with some embodiments of the technology described herein.

FIG. 3 shows an illustrative state machine 300, in accordance with some embodiments. In some embodiments, the state machine 300 may be used for implementing encryption software 120 (e.g., including at least a part or all of the illustrative control module 122) in the example of FIG. 1. In some embodiments, the state machine 300 may be implemented in hardware (e.g., using an ASIC, an FPGA, or any other suitable circuitry), software (e.g., by executing the software using a computer processor), or any suitable combination thereof.

In this example, the state machine 300 includes a command generator 304, which may be configured to generate a series of commands to be executed by the state machine 300. The commands described with reference to FIG. 3 may be used to implement respective operations. Thus, as described herein including with reference to the illustrative examples of FIGS. 3 and 4, executing a command results in performance of the respective operation (for example, executing an "Input" command described below results in the performance of the "input" operation described above, etc.). In some embodiments, the command generator 304 may select commands (e.g., one at a time) from a plurality of available commands (each command representing a respective operation). However, that is not required. In some embodiments, the command generator 304 may construct one or more commands, in addition to, or instead of, selecting one or more commands. For instance, to generate a next command in the series, the command generator 304 may select an opcode from a plurality of opcodes in a suitable instruction set architecture (ISA), and construct a command by providing one or more operands for the opcode. An opcode may comprise one or more alphanumeric symbols specifying an operation to be performed.

In some embodiments, the command generator 304 may generate one or more commands probabilistically. For instance, the command generator 304 may select an opcode from a plurality of opcodes according to a suitable probability distribution over the plurality of opcodes. This may be implemented in any suitable manner. In some embodiments, the plurality of opcodes may be stored in a data structure (e.g., a list), where a number of appearances of each opcode may be proportional to a probability assigned to the opcode. As an example, an ISA may have three opcodes, which are assigned, respectively, probabilities 0.5, 0.25, and 0.25. The opcode assigned probability 0.5 may appear twice, whereas the other two opcodes may each appear once. In this manner, two random bits from a random number generator may be used to select an opcode from the data structure, where each of the three opcodes in the ISA may be selected with the respective assigned probability.

Additionally, or alternatively, the command generator 304 may use random input to provide an operand for a selected opcode. For instance, a select opcode (e.g., Salt) may indicate that a salt is to be encrypted and placed in an outgoing buffer (e.g., the illustrative outgoing buffer 126 in the example of FIG. 1), and an operand for this opcode may indicate a length for the salt. The command generator 304 may use a first set of random bits from a random number generator to select a length. Additionally, or alternatively, the command generator 304 may use a second set of random bits from the random number generator to provide a salt of the generated length.

In some embodiments, the command generator 304 may construct a command based on a selected opcode and/or one or more operands. The command may be placed into a command buffer 306. In some embodiments, a command stored in the command buffer 306 may be sent to an encryption module (e.g., the illustrative encryption module 124 in the example of FIG. 1) as plaintext to be encrypted. The encryption module may implement a block cipher or a stream cipher, and may return a ciphertext corresponding to the plaintext command. The ciphertext may be placed into the outgoing buffer for transmission via a channel (e.g., the illustrative communication channel 130 in the example of FIG. 1). Additionally, or alternatively, the plaintext command and/or the corresponding ciphertext may be placed into a history buffer (not shown), which may be part of state information 310.

In some embodiments, a command interpreter 308 may read and interpret commands from the command buffer 306. According to a command being interpreted, the command interpreter 308 may update the state information 310 and/or perform one or more other actions.

It should be appreciated that any suitable opcode may be used in addition to, or instead of, the Salt command described above. For instance, in some embodiments, an Input opcode may be used that indicates that an input of a desired length is to be read from an input buffer 302, which may store input messages (e.g., the illustrative input message 113 in the example of FIG. 1) from a user (e.g., Alice in the example of FIG. 1) and/or a software application. The command generator 304 may read a suitable number of bits from the input buffer 302, and may use those bits to generate an appropriate command to be placed into the command buffer 306. For instance, the command generator 304 may generate a command that, when executed, returns the bits read from the input buffer 302. In some embodiments, the command may be a constant function that takes zero or more inputs, and returns a same value (i.e., the bits read from the input buffer 302) regardless of input.

In some embodiments, a SaveState opcode may indicate that some or all of the state information 310 is to be saved in a data store (not shown). The data store may, although need not, be a persistent storage. The command generator 304 may place a corresponding command into the command buffer 306. Upon reading the command from the command buffer 306, the command interpreter 308 may save the indicated state information. For instance, the state information 310 may include a plurality of state variables. Current values of one or more of these state variables may be saved in the data store. In some embodiments, the data store may include a content addressable storage, and a hash of the saved values may be used as an index for accessing the saved values from the data store.

In some embodiments, a RestoreState opcode may indicate that some or all of the state information 310 is to be replaced by information previously saved in the data store. The command generator 304 may place a corresponding command into the command buffer 306. Upon reading the command from the command buffer 306, the command interpreter 308 may retrieve the indicated information from the data store, and modify the state information 310 accordingly. For instance, the state information 310 may include a plurality of state variables. Current values of one or more of these state variables may be replaced by respective stored values retrieved from the data store.

In some embodiments, a ShutDown opcode may indicate that some or all the state information 310 is to be saved in the data store, and the state machine 300 is to be shut down. The indicated state information may be saved in a manner that is similar to that described above for the SaveState opcode.

It should be appreciated that examples of opcodes are provided herein solely for illustrative purposes. Moreover, aspects of the present disclosure are not limited to using opcodes to generate commands. For instance, in some embodiments, the command generator 304 may generate a command that, when executed, changes one or more random number generators used by the state machine 300. There may be no opcode for this command. Additionally, or alternatively, this command may be local to the state machine 300, and may not be transmitted in either plaintext form or ciphertext form.

In some embodiments, the state machine 300 may include a parameter generator 312 configured to generate one or more control parameters for the encryption module 124. Examples of control parameters include, but are not limited to, a symmetric key used to encrypt and decrypt messages, an initialization vector for a block cipher or a stream cipher, a substitution alphabet for a polyalphabetic cipher, etc.

In some embodiments, the state information 310 may include a state variable that stores a current value of a control parameter. The parameter generator 312 may combine the current value of the control parameter with one or more random values, thereby obtaining a new value of the control parameter. The new value may be provided to the encryption module 124, and may be used by the encryption module 124 to encrypt a next command from the command buffer 306. Additionally, or alternatively, the state variable in the state information 310 may be updated with the new value of the control parameter.

The current value of the control parameter may be combined with the one or more random values in any suitable manner. For instance, one or more operations such as rotation, exclusive OR (XOR), modular addition, etc. may be used in any suitable configuration.

In some embodiments, the state machine 300 may obtain the one or more random values from a random number generator (e.g., a pseudo random number generator seeded with a random input from an entropy source). Such random values may be stored in the state information 310, and/or provided to the parameter generator 312.

Additionally, or alternatively, the one or more random values may be obtained based on randomness harvested from a history buffer (not shown) in the state information 310. A history buffer, as used herein, may store one or more operations previously performed by the encryption device. In some embodiments, one or more portions of the history buffer may be used to harvest randomness. For instance, a most recent entry in the history buffer, and/or one or more other entries (e.g., two other entries) may be combined. The one or more other entries may be selected in any suitable manner, for example, by randomly selecting one or more offsets from the most recent entry.

In some embodiments, the history buffer may be a circular buffer of a selected size (e.g., 256 bytes), where a current index may point to the most recent entry. When a new entry is to be written, the current index may be advanced, and the new entry may be written at the advanced entry, replacing a least recent entry. However, it should be appreciated that aspects of the present disclosure are not limited to any particular implementation of a circular buffer, or to using circular buffers at all. In some embodiments, the current index may point to a least recent entry. A new entry may be written at the current index before the current index is advanced.

Figure 4:
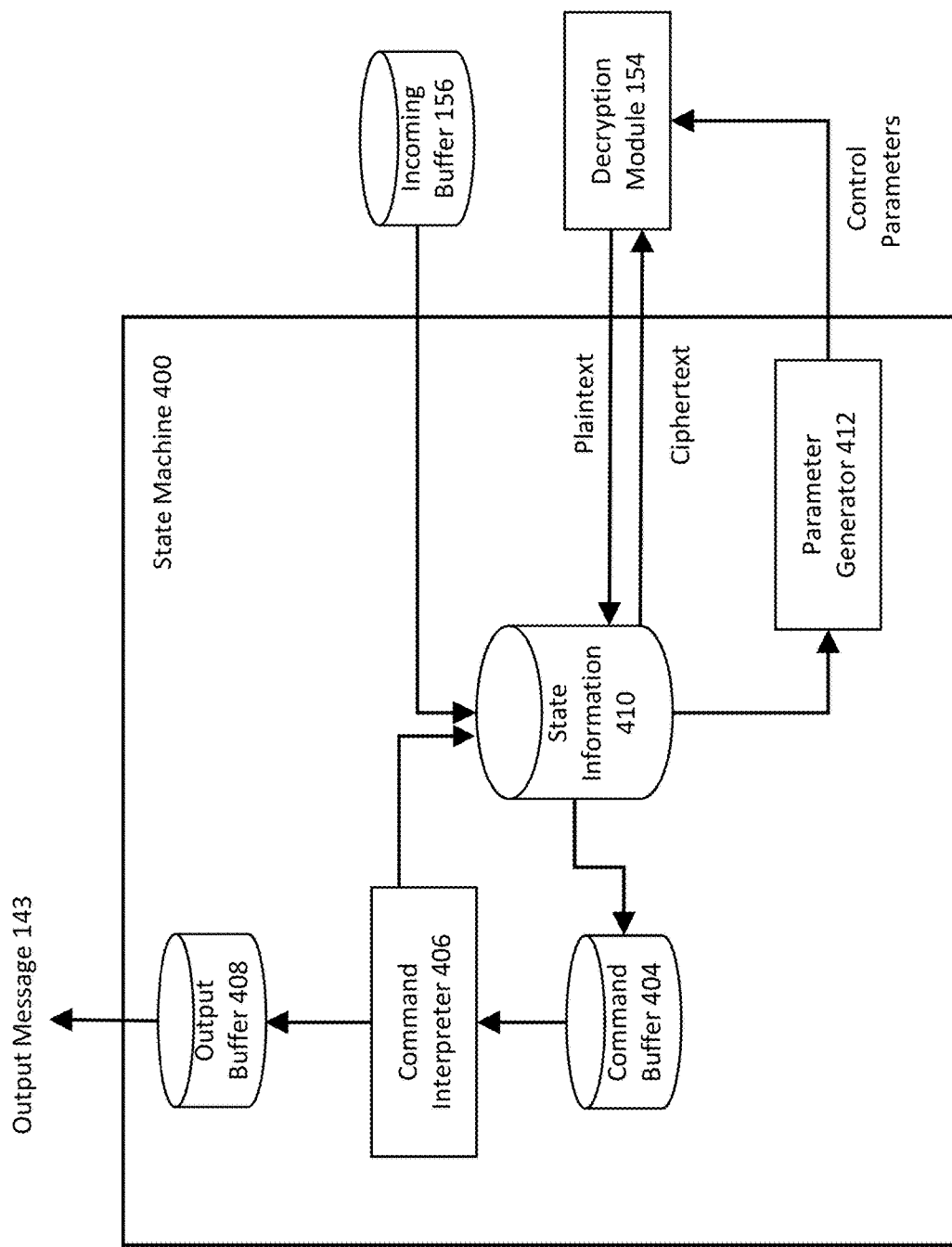
FIG. 4 shows an illustrative state machine 400, in accordance with some embodiments of the technology described herein.

FIG. 4 shows an illustrative state machine 400, in accordance with some embodiments. In some embodiments, the state machine 400 may be used for implementing decryption software 150 (e.g., including at least a part or all of the illustrative control module 152) in the example of FIG. 1.

In this example, ciphertext messages may be received via a communication channel (e.g., the illustrative communication channel 130 in the example of FIG. 1), and placed into an incoming buffer (e.g., the illustrative incoming buffer 156 in the example of FIG. 1). The state machine 400 may retrieve the ciphertext messages from the incoming buffer for processing.

In some embodiments, the state machine 400 may send a ciphertext to a decryption module (e.g., the illustrative decryption module 154 in the example of FIG. 1) to be decrypted. The decryption module may implement a decryption algorithm, and may return a plaintext corresponding to the ciphertext.

In some embodiments, the plaintext may be a command generated by the illustrative command generator 304 in the example of FIG. 3, and the state machine 400 may place the command into a command buffer 404. Additionally, or alternatively, the ciphertext and/or the corresponding plaintext command may be placed into a history buffer (not shown), which may be part of state information 410.

In some embodiments, a command interpreter 406 may read and interpret commands from the command buffer 404. According to a command being interpreted, the command interpreter 406 may update the state information 410 and/or perform one or more other actions. As one example, a command generated by the command generator 304 based on the Input opcode may be a constant function that causes the command interpreter 406 to return a suitable number of message bits. The command interpreter 406 may place the returned bits into an output buffer 408 as an output message (e.g., the illustrative output message 143 in the example of FIG. 1) to be accessed by a user (e.g., Bob in the example of FIG. 1) and/or a software application.

The inventors have recognized and appreciated that, by executing a series of commands generated probabilistically by the command generator 304, the state machine 300 may undergo changes in an unpredictable manner, which may improve security. To allow proper decryption, the state machine 400 may undergo matching changes. Accordingly, in some embodiments, the series of commands executed by the state machine 300 may be transmitted to the state machine 400, which may also execute the series of commands. In this manner, the state machine 400 may stay synchronized with the state machine 300.

In some embodiments, the series of commands executed by the state machine 300 may be encrypted prior to being transmitted to the state machine 400. For instance, the state machine 300 may encrypt a command, its operand, and/or data prior to executing the command. In this manner, the state machine may be at a current state while the command is encrypted, and may move to a new state as a result of executing the command. This may allow the state machine 400, which may still be at a current state when the encrypted command is received, to correctly decrypt the encrypted command. The state machine 400 may then execute the decrypted command to also move to a new state.

With reference to the example of FIG. 3, a command, when executed by the state machine 300, may cause the parameter generator 312 to provide a new value of a control parameter to the encryption module 124. Prior to executing the command, the state machine 300 may encrypt the command.

Returning to the example of FIG. 4, the encrypted command may be transmitted to the state machine 400, which may decrypt the encrypted command, and then execute the decrypted command. This may cause a parameter generator 412 to generate a new value of the control parameter. The new value may be provided to the decryption module 154, and may be used by the decryption module 154 to decrypt a next ciphertext from the incoming buffer 156.

In some embodiments, the state information 410 may include a state variable that stores a current value of the control parameter. The parameter generator 412 may combine the current value of the control parameter with one or more random values to obtain the new value of the control parameter. In some embodiments, the state variable in the state information 410 may be updated with the new value of the control parameter.

Although details of implementation are shown in FIGS. 3-4 and described herein, it should be appreciated that such details are provided solely for illustrative purposes. Aspects of the present disclosure are not limited to any particular manner of implementation.

The inventors have recognized and appreciated that security may be improved by applying one or more transformations before and/or after a plaintext is encrypted into a ciphertext. This may increase a difficulty of a successful attack, and may improve robustness against side-channel attacks, in particular.

Figure 5:
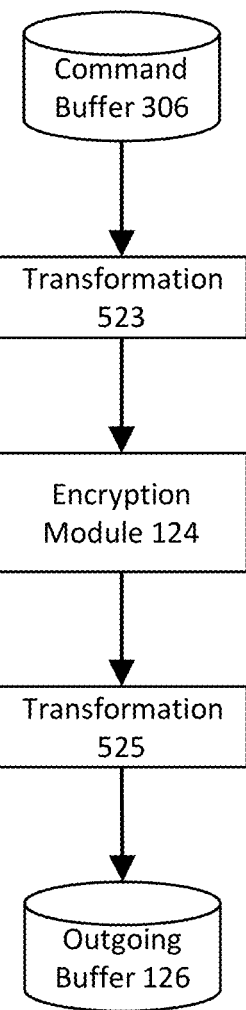
FIG. 5 shows illustrative transformations that may be performed at an encryption device, in accordance with some embodiments of the technology described herein.

FIG. 5 shows illustrative transformations 523 and 525, in accordance with some embodiments. For instance, the transformation 523 may be performed on a command from the illustrative command buffer 306 in the example of FIG. 3, and a result of transforming the command may be provided to the illustrative encryption module 124 as plaintext to be encrypted. Additionally, or alternatively, the transformation 525 may be performed on a ciphertext output by the encryption module 124, and a result of transforming the ciphertext may be placed into the outgoing buffer 126.

In some embodiments, the encryption module 124 may implement a cipher with a plaintext alphabet and a ciphertext alphabet. The plaintext alphabet may be the same as, or different from, the ciphertext alphabet. An example of an alphabet is the set of bit strings of length n for some suitable n=0, 1, 2, 3, 4, . . .

For n=0, a corresponding alphabet has only one symbol, namely, the empty string.
For n=1, a corresponding alphabet has two symbols, namely, 0 and 1.
For n=2, a corresponding alphabet has four symbols, namely, 00, 01, 10, and 10.
For n=3, a corresponding alphabet has eight symbols, namely, 000, 001, 010, 011, 100, 101, 110, and 111.
For n=4, a corresponding alphabet has sixteen symbols, namely, 0000, 0001, 0010, 0011, 0100, 0101, 0110, 0111, 1000, 1001, 1010, 1011, 1100, 1101, 1110, and 1111.
Etc.

In general, an alphabet comprising the set of bit strings of length n may have at least $2^n$ symbols. The string may have any suitable type of symbols including numeric symbols, alphabetic symbols, and/or any other suitable types of symbols, as aspects of the technology described herein is not limited to a particular type of alphabet.

In some embodiments, the encryption module 124 may implement a polyalphabetic cipher, whereby plaintext symbols may be mapped to ciphertext using different alphabets at different times. One example of such a cipher, developed by the inventors, is the randomized partitioned permutation cipher (RPPC) described herein.

In some embodiments, the transformation 523 may map the symbols representing a command from the illustrative command buffer 306 to one or more symbols in the plaintext alphabet of the encryption module 124. For instance, a command may be represented by a first string of symbols in the plaintext alphabet of a first generated length. The transformation 523 may map the command to a second string of symbols in the plaintext alphabet of the same length, for example, by applying a mapping φ to each symbol in the first string of symbols (e.g., substituting φ(s) for s, for some s in the plaintext alphabet).

Although the transformation 523 in this example is an endomorphism on the set of plaintext symbol strings of the first length, aspects of the present disclosure are not so limited. In some embodiments, a command may be represented in another manner, for example, using an alphabet that is different from the plaintext alphabet.

In some embodiments, the encryption module 124 may receive as input the second string of symbols in the plaintext alphabet, and output a third string of symbols in the ciphertext alphabet. The third string of symbols may have a second generated length, which may be the same as, or different from, the length of the first string of symbols and the second string of symbols.

In some embodiments, the third string of symbols in the ciphertext alphabet may in turn be provided to the transformation 525 as input. The transformation 525 may output a fourth string of symbols in the ciphertext alphabet, which may be of the same length as the third string of symbols. For instance, the transformation 525 may obtain the fourth string of symbols by applying a mapping ψ to each symbol in the third string of symbols (e.g., substituting ψ(t) for t, for some t in the ciphertext alphabet).

Although the transformation 525 in this example is an endomorphism on the set of ciphertext symbol strings of the second length, aspects of the present disclosure are not so limited. In some embodiments, the transformation 525 may map each symbol in the third string of symbols to a symbol in an alphabet that is different from the ciphertext alphabet.

The inventors have recognized and appreciated that, if the mapping φ for the transformation 523 is one-to-one, then the transformation 523 is invertible for each φ map. Likewise, if the mapping ψ for the transformation 525 is one-to-one and onto (e.g., a permutation on the ciphertext alphabet), then the transformation 525 is invertible. In some embodiments, inverses of the transformations 523 and 525 may be used in a decryption process.

Figure 6:
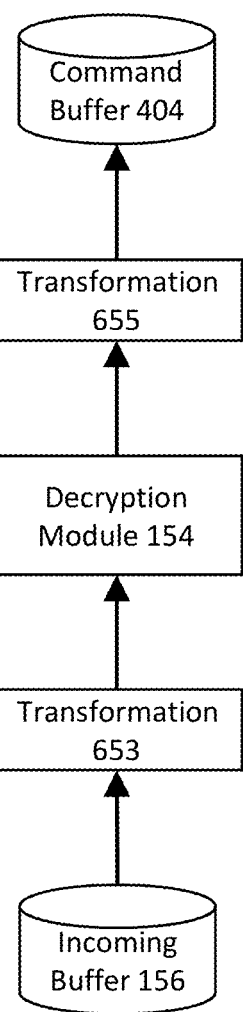
FIG. 6 shows illustrative transformations that may be performed at a decryption device, in accordance with some embodiments of the technology described herein.

FIG. 6 shows illustrative transformations 653 and 655, in accordance with some embodiments. For instance, the transformations 655 and 653 may be, respectively, inverses of the illustrative transformations 523 and 525 in the example of FIG. 5.

In some embodiments, the transformation 653 may be performed on a message retrieved from the illustrative incoming buffer 156 in the example of FIG. 4. A result of transforming the message may be provided to the illustrative decryption module 154 as ciphertext to be decrypted. Additionally, or alternatively, the transformation 655 may be performed on a plaintext output by the decryption module 154, and a result of transforming the plaintext may be placed into the illustrative command buffer 404 in the example of FIG. 4.

Although two sets of transformations (i.e., 523 and 655, and 525 and 653) are described above in connection with FIGS. 5-6, it should be appreciated that aspects of the present disclosure are not so limited. In some embodiments, only one set of the transformations (e.g., 523 and 655, or 525 and 653) may be used, or no transformation at all.

Figure 7:
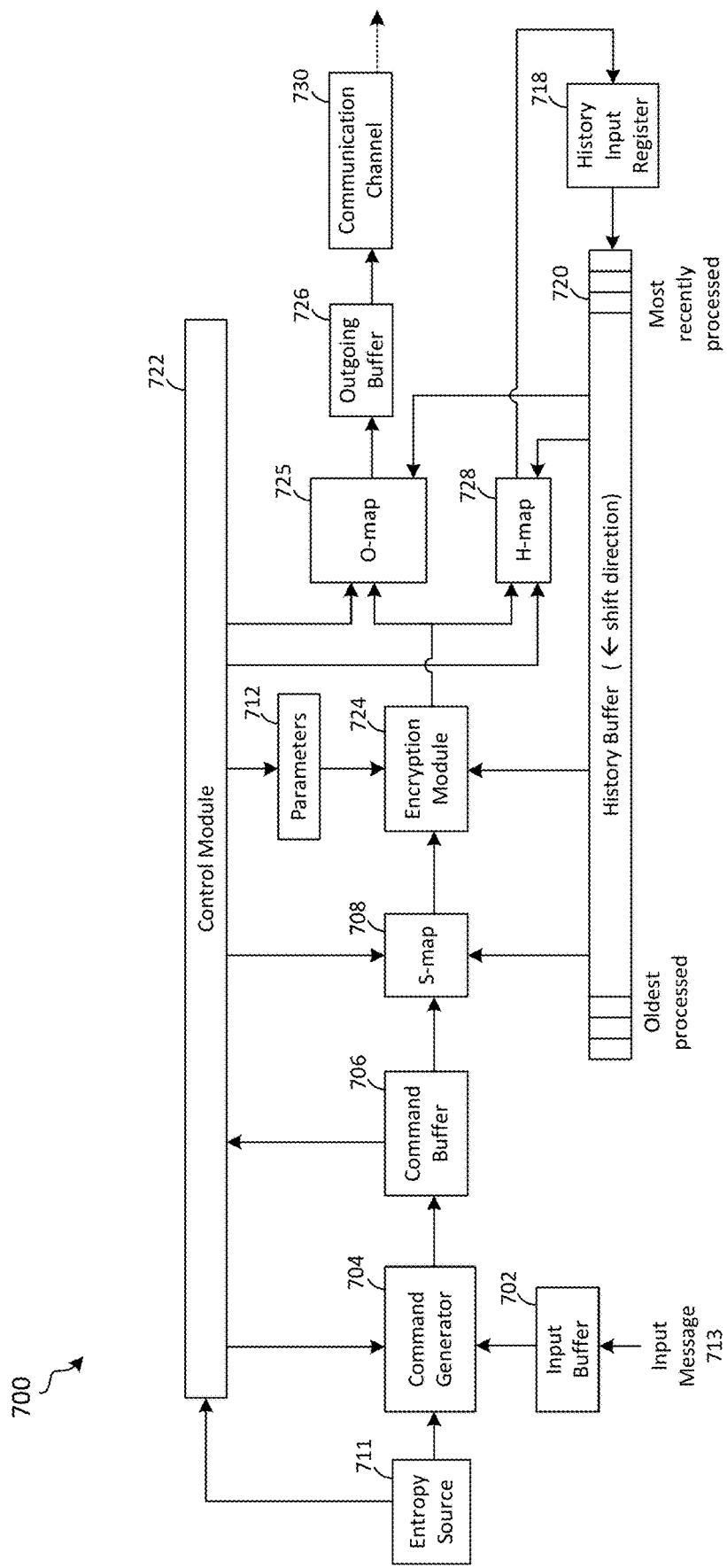
FIG. 7 shows an illustrative encoding system 700, in accordance with some embodiments of the technology described herein.

FIG. 7 shows an illustrative encryption device 700, in accordance with some embodiments. For instance, encryption device 700 may be an implementation of the illustrative encryption device 110 of FIG. 1. Encryption device 700 may be implemented in software, in hardware, or any suitable combination thereof.

In some embodiments, encryption device 700 may receive input message 713 (e.g., from a user) and may place the input message 713 into the input buffer 702, to be read by the command generator 704. In some embodiments, the command generator 704 may be the same as the command generator 304 of FIG. 3. The command generator 704 may select a command from a plurality of commands each of the commands representing a respective operation. The command generator may select a command from a plurality of commands at random using one or more random values obtained from entropy source 711 (which may be a random number generator or any other suitable source of randomness). The command generator 704 may then write the selected command to the command buffer 706.

In some embodiments, the command buffer 706 may then send the plaintext command, operands, and data to S-map 708 and the control module 722. The S-map 708 may, in some embodiments, be an implementation of transformation 523 of FIG. 5. S-map 708 may additionally include a whitening transformation in addition to transformation 523. The S-map 708 may comprise one or more time-varying transformations (e.g., transformation 523 and/or a whitener). In some embodiments, the transformation and/or whitener may be combined into one module, but in some embodiments the transformation and/or whitener may be performed separately.

In some embodiments, the plaintext (i.e., command symbols) may be whitened so that any unequal frequency of occurrence of symbols may be replaced by a set of symbols that are statistically equally likely. The whitening acts pointwise in that each input symbol may be equally likely to be mapped to each output symbol and each association of an output symbol with an input symbol may be independent of any other such association. Furthermore, in some embodiments, the association of input with output may change randomly over time so that it is not possible to predict the effect of the map in any particular instance.

In some embodiments, the symbols output by the whitener of S-map 708 may be assigned a representation from the set of input symbols to the encryption device. The choice of representation (e.g., by a number in binary) may be arbitrary and may change with every symbol assigned. The choice of representation may change with a periodic number or a non-periodic number of symbols assigned.

In some embodiments, the time-varying nature of the component maps may cause the S-map 708 to appear to be random. The variability of S-map 708 may be controlled by randomness available at both the encryption device and decryption device. The variability of S-map 708 may increase security of the encryption by increasing the length of a search to break the cipher.

After performing a transformation on the command, S-map 708 may send the transformed command to the encryption module 724 to be encrypted. The encryption module may encrypt the command and data and may use parameters 712 from control module 722. Alternately, in some embodiments, parameters 712 may be an implementation of parameter generator 312 of FIG. 3. The encryption module 724 may then output the encrypted command (e.g., the ciphertext) to O-map 725 and/or H-map 728. The O-map 725 and/or H-map 728 may be implementations of transformation 525 of FIG. 5, in some embodiments.

In some embodiments, the O-map 725 may transform the ciphertext to generate transformed ciphertext. O-map 725 may then write the transformed ciphertext into outgoing buffer 726. Outgoing buffer 726 may transmit the transformed ciphertext via communication channel 730. Alternately, outgoing buffer 726 may output the transformed ciphertext to be written to a memory (not pictured).

In some embodiments, the H-map 728 transforms the ciphertext to generate transformed ciphertext. H-map 728 may also transform parameters indicating a state of the control module 722. H-map 728 may then place the transformed ciphertext and/or parameters into the history input register 718. The transformed ciphertext may then be passed from the history input register 718 to the history buffer 720. As such, the information in the history buffer 720 includes information indicating which operations and related data were previously executed by the device 700.

In some embodiments, history buffer 720 may provide a source of entropy based on previously-encrypted commands for components of encryption device 700.

For example, history buffer 720 may provide entropy to the S-map 708, O-map 725, and H-map 728 in place of or in addition to entropy from entropy source 711. History buffer 720 may optionally provide entropy to the encryption module 720 for the encryption process.

Figure 8:
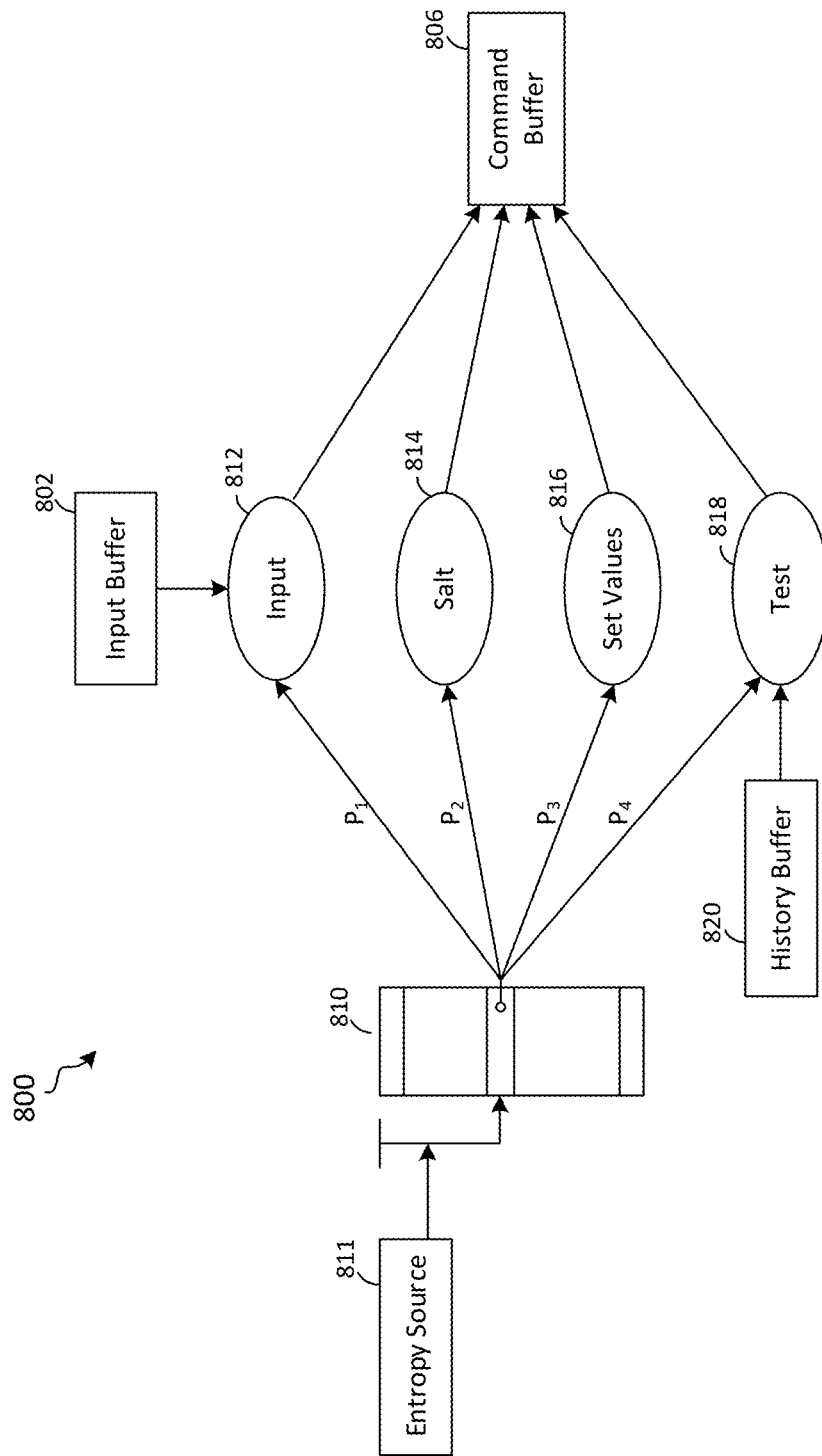
FIG. 8 shows an illustrative command probability vector, in accordance with some embodiments of the technology described herein.

FIG. 8 shows an illustrative schematic 800 for selecting a command, in accordance with some embodiments. For example, schematic 800 may be used to facilitate selecting a command, as described by command generator 704 of FIG. 7.

In some embodiments, commands may be stored in a data structure such as probabilistic instruction generator vector (PIGV) 810. Each of the commands may be assigned a probability of selection, $P_1 \ldots P_N$, such that a first command assigned a higher probability appears more often in PIGV 810 than a second command assigned a lower probability. In this example, four possible selected commands are shown, but any suitable number of commands may be stored in PIGV 810. Entropy source 811, which may be any suitable entropy source including but not limited to a random number generator, may be used to select an index in PIGV 810, thereby selecting at random a command from PIGV 810. The command may then be written to the command buffer 806.

In this example, potential commands for selection include Input 812, Salt 814, Set Values 816, and Test 818. Input 812 may read in one or more bits of the input message from the input buffer 802. Salt 814 may be an operation for the generation of one or more random values, as described herein. Set Values 816 may set one or more parameter values indicating a state change of the encryption device and/or encryption module. For example, Set Values 816 could set a parameter value of the S-map 708, the O-map 725, or the encryption module 724. Test 818 may represent a command for reading in one or more values from the history buffer 820 for the purpose of detecting tampering.

Figure 9:
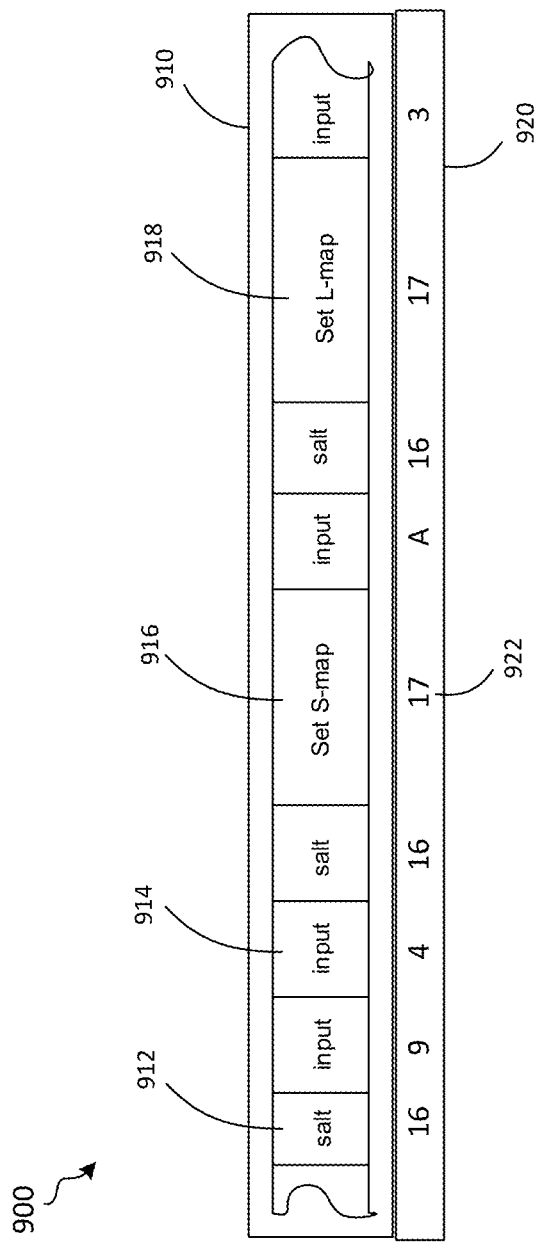
FIG. 9 shows an illustrative stream of commands and corresponding ciphertext, in accordance with some embodiments of the technology described herein.

FIG. 9 shows an illustrative stream of commands 910 as produced by, for example, command generator 704 and a corresponding stream of ciphertext 920 as produced, for example, by the encryption module 724, according to some embodiments. In this example, the stream of commands 910 includes commands such as Salt 912, Input 914, Set S-map 916, and Set L-map 918. In the corresponding stream of ciphertext 920, these commands are represented as a stream of ciphertext symbols 922. In this example, the ciphertext symbols are alphanumeric, but the cipher alphabet need not be alphanumeric as shown in this example.

As may be further appreciated from the example of FIG. 9, the stream of commands includes information identifying the operations performed by an encoding device (e.g., the "salt", "input" and "change state" operation). In this example, the change-state operations represented by commands 916 and 918 to set the "S-map" to new values and the "L-map" to new values.

Figure 10:
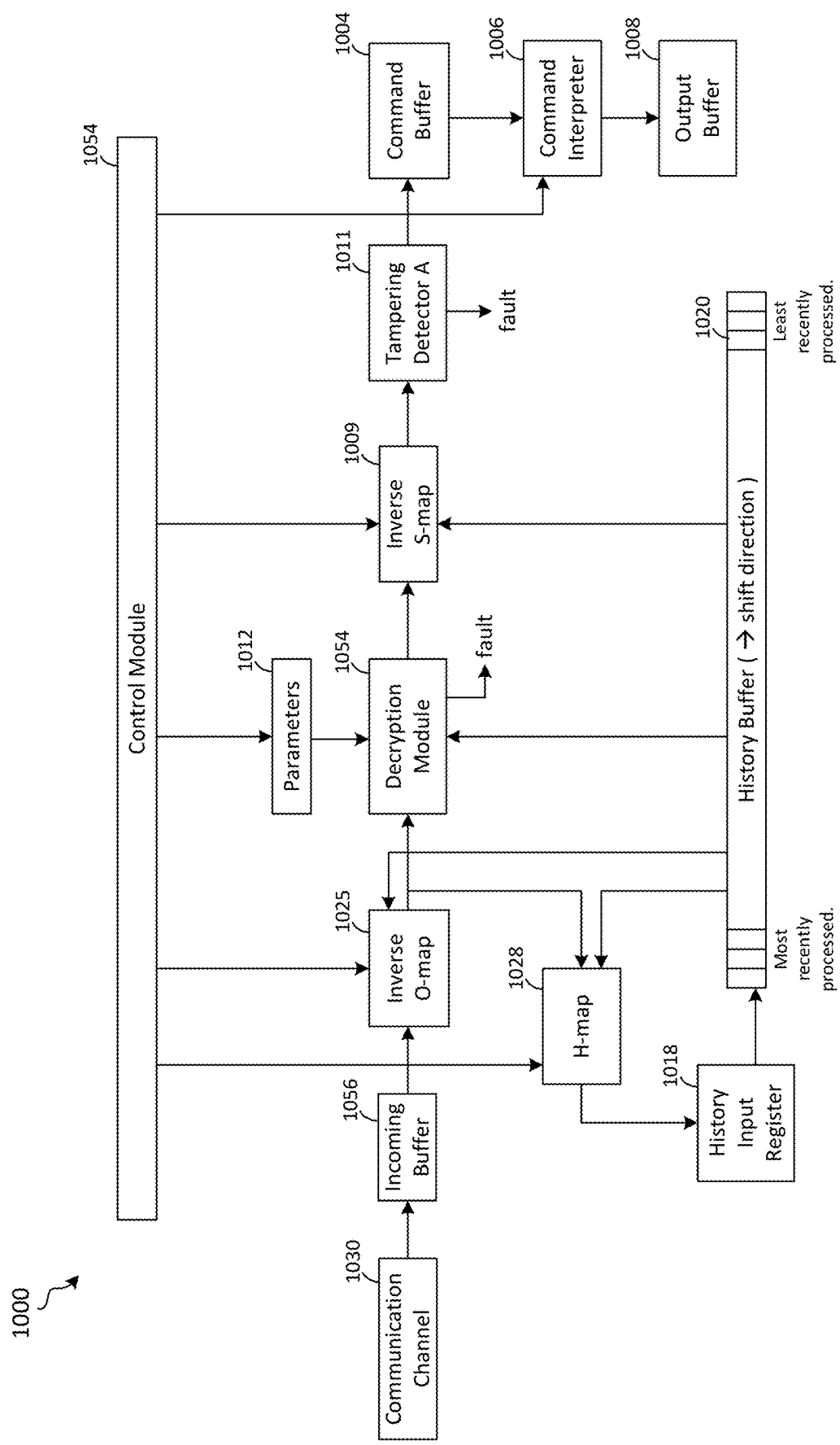
FIG. 10 shows an illustrative decoding system 1000, in accordance with some embodiments of the technology described herein.

FIG. 10 shows an illustrative decryption device 1000, in accordance with some embodiments. For instance, decryption device 1000 may be an implementation of the illustrative decryption device 140 of FIG. 1. Decryption device 1000 may be implemented in software, in hardware, or any suitable combination thereof.

In this example, the incoming buffer 1056 may receive transformed ciphertext from communication channel 1030. In some embodiments, the incoming buffer 1056 may receive transformed ciphertext from a computer-readable storage medium. The incoming buffer 1056 may then write the transformed ciphertext to the Inverse O-Map 1025. Inverse O-map 1025 may be a transformation like transformation 653 of FIG. 6. Inverse O-map 1025 may apply an inverse transformation to the transformed ciphertext to output ciphertext. The Inverse O-map 1025 may send the ciphertext to decryption module 1054 and H-map 1028.

In some embodiments, decryption module 1054 may then decrypt the ciphertext based on parameters 1012 from control module 1054. Decrypting the ciphertext may yield transformed plaintext. Decryption module 1054 may output a fault or error signal if it detects an issue with decrypting the ciphertext (e.g. an incorrect Message Authentication Code). Decryption module 1054 may send the transformed plaintext to the inverse S-map 1009.

In some embodiments, the inverse S-map 1009 may be an implementation of transformation 655 of FIG. 6. Inverse S-map 1009 may additionally comprise an inverse whitening transformation. Inverse S-map 1009 may apply an inverse transformation to the transformed plaintext, outputting plaintext to tampering detector 1011. Tampering detector 1011 may output a fault signal if it detects tampering (e.g., from an eavesdropper). For example, when the command alphabet comprises fewer symbols than the plaintext alphabet, tampering detector 1011 may output an indication of a fault when the inverse S-map 1009 sends any of the unused command alphabet symbols.

In some embodiments, the plaintext may then be passed to the command buffer 1004, which writes the plaintext to the command interpreter 1006. Command interpreter 1006 may then write the plaintext to the output buffer 1008.

In some embodiments, inverse O-map 1025 also passes ciphertext to H-map 1028. H-map 1028 may then apply a transformation to the ciphertext, to form transformed ciphertext which may be written to the history input register 1018 and then to the history buffer 1020. In this way, the history buffers 720 and 1020 of the encryption device 700 and decryption device 1000 may stay synced. Syncing the history buffers 720 and 1020 means that the source of entropy within the system is synced, allowing for synced transformations across both the encryption device 700 and decryption device 1000.

While any encryption method may be used in the encryption and decryption devices described herein (e.g., encryption devices 110 and 700, and decryption devices 140 and 1000), the inventors have developed a new type of polyalphabetic cipher, termed the randomized partitioned permutation cipher (RPPC), which is well suited for implementation with the encryption and decryption devices described herein. Thus, in some embodiments, the RPPC may be used with the encryption and decryption devices described herein. In other embodiments, other encryption algorithms such as AES or any other suitable cipher may be used instead of the RPPC, as aspects of the technology described herein are not limited by requiring that the RPPC be used as part of the encryption and decryption devices described herein.

The RPPC is described herein including with reference to FIGS. 11A-11B, (these figures describe the process of encoding a single plaintext symbol to obtain a corresponding ciphertext symbol using the RPPC configured with a single "language"—a term described below) and FIGS. 12A-12E (these figures describe how an RPPC may utilize one or multiple "languages" to encode multiple plaintext symbols to obtain corresponding ciphertext symbols.

Before describing these figures, some preliminaries. In some embodiments, a randomized partitioned permutation cipher may be associated with one or multiple languages. Each language includes or is associated with multiple pieces of information: (1) a set of ciphertext symbols; (2) a permutation of the set of ciphertext symbols; (3) a partition of the permutation of the set of ciphertext symbols. Each language may be further associated with a decryption vector, which may be derived using the partition, as explained below herein.

In some embodiments, a set of ciphertext symbols (which may be considered to be an alphabet) may be represented by numeric symbols, alphabetic symbols, alphanumeric symbols, and/or any other suitable types of symbols. The set of ciphertext symbols may include any suitable number of ciphertext symbols. For example, the set of ciphertext symbols may comprise at least 50 symbols, at least 100 symbols, at least 200 symbols, 256 symbols, at least 500 symbols, at least 1000 symbols, at least 10,000 symbols, any number of symbols between 50 and 10,000 or any other suitable number of symbols. In some embodiments, information specifying the set of ciphertext symbols may be stored using any suitable data structure(s) and in any suitable format, as aspects of the technology described herein are not limited in this respect.

A permutation of the set of ciphertext symbols may be a reordering of the set of ciphertext symbols. For example, if the set of ciphertext symbols has the 16 symbols: [0 1 2 3 4 5 6 7 8 9 10 11 12 13 14 15], then [13 4 3 8 6 12 10 5 7 15 2 11 0 9 14 1] is a permutation of the set of ciphertext symbols (it may be thought of as a result of the act of re-ordering the symbols in the set of ciphertext symbols). If a set of ciphertext symbols includes N symbols, then there are N! permutations of the set of ciphertext symbols. In some embodiments, information specifying the permutation may be stored using any suitable data structure(s) and in any suitable format, as aspects of the technology described herein are not limited in this respect.

A partition of a permutation includes multiple subsets of the ciphertext symbols. In some embodiments, the multiple subsets may be mutually disjoint, non-empty proper subsets that cover the set of ciphertext symbols of the language (so that every ciphertext symbol of the set of ciphertext symbols is included in one of the multiple subsets of the partition). Continuing with the previous example, the following are examples of different partitions of the above permutation:

4 subsets of 4 symbols each: [13 4 3|8 6 12|10 5 7|15 2 11|0 9 14 1]

6 subsets of unequal size: [13 4|3 8 6|12|10 5 7 15|2 11|0 9 14 1].

A partition may have any suitable number of subsets.

In some embodiments, to facilitate the detection of tampering by an adversary, only a subset of ciphertext symbols in a language may be used. In such instances, some of the ciphertext symbols are designated as active, so that they may be used for encoding plaintext symbols, whereas others are inactive and are not to be used for encoding plaintext symbols. In this way, receipt of at least a threshold number (e.g., at least one, at least five, at least 10, etc.) of inactive ciphertext symbols by the decoding device may indicate tampering with the communication channel or the encoding device.

For example, let the bolded 12 ciphertext symbols be the "active" ciphertext symbols, in the set of ciphertext symbols from the above example. That means there are 12 active symbols (bolded) and four inactive (not bolded) symbols as shown below:

[13 4 3 8 6 12 10 5 7 15 2 11 0 9 14 1].

In some such embodiments, the partition of the permutation may be a partition of only the active set (it may be induced by a partition on the whole set, in some embodiments, as well). Accordingly, the partition may be a set of four subsets of the active symbols, each having three symbols each, with the inactive symbols omitted:

{13 4 3} {8 6 12} {10 5 7} {15 2 11}.

As described above, in some embodiments, each language is associated with a respective decryption vectors, which may be derived from the partition for the language. Each decryption vector may define a mapping from a ciphertext symbol to a plaintext symbol such that the decryption device may, based on the ciphertext symbol and the decryption vector, determine the original plaintext symbol. The decryption vector is described herein including with reference to FIG. 12E.

Figure 11A:
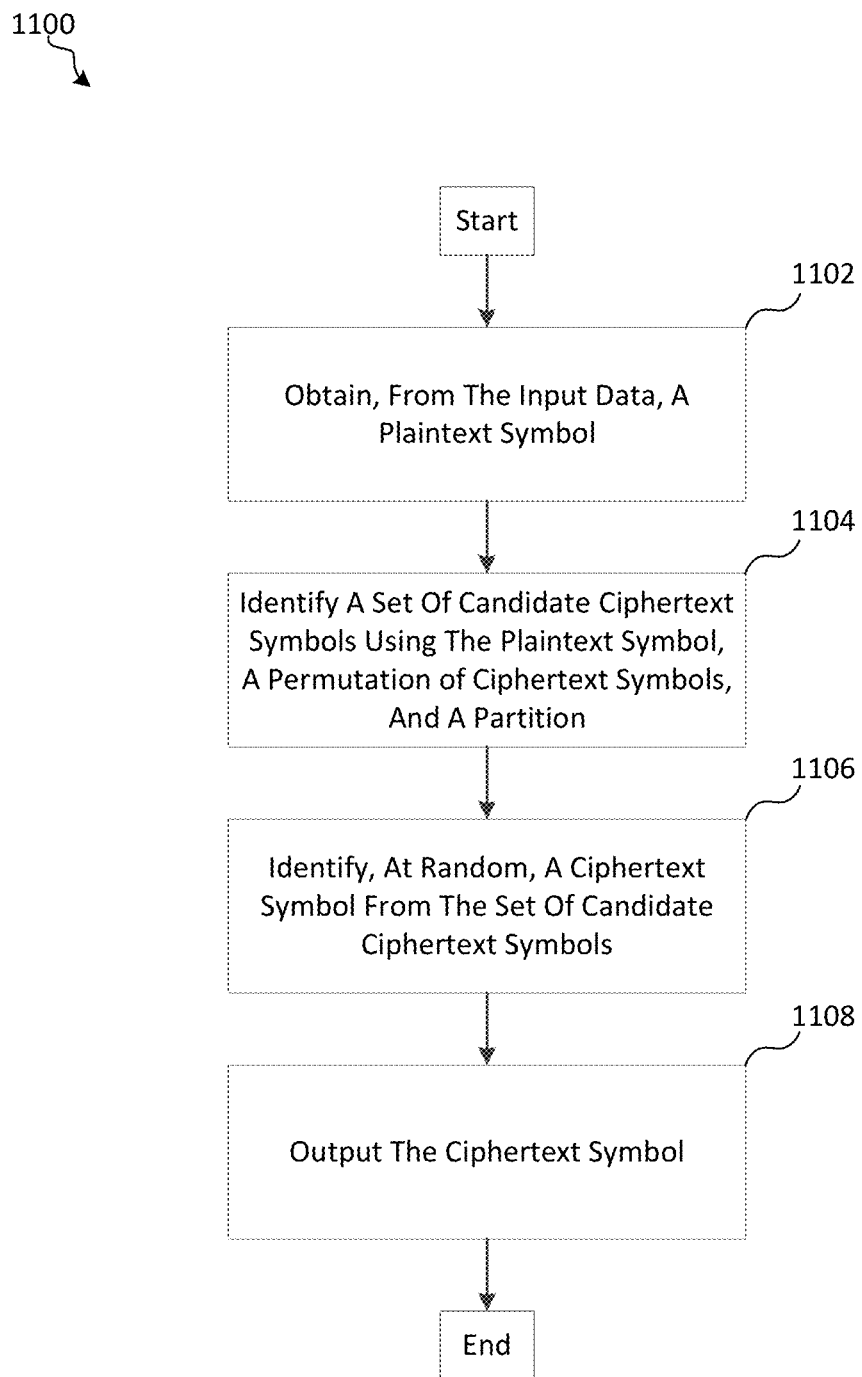
FIG. 11A shows an illustrative process 1100 for encrypting data using a randomized partitioned permutation cipher (RPPC), in accordance with some embodiments of the technology described herein.

FIG. 11A shows an illustrative process 1100 for encrypting input data using an RPPC, according to some embodiments. Process 1100, for example, may be implemented in encryption module 724 of FIG. 7 and run on any suitable computing device, such as computing device 1300 of FIG. 13. In some embodiments, the process 1100 may be performed by hardware (e.g., using an ASIC, an FPGA, or any other suitable circuitry), software (e.g., by executing the software using a computer processor), or any suitable combination thereof.

In act 1102, a plaintext symbol may be obtained from the input data. In some embodiments, the plaintext symbol may represent, for example, part of an input message, and may be obtained from an external source (e.g., a user). Alternately, the plaintext symbol may represent at least a part of a command and/or information identifying a command. The plaintext symbol may, in some embodiments, be obtained from a command generator (e.g., illustrative command generator 704 of FIG. 7).

Next, process 1100 proceeds to acts 1104 and 1106, where the plaintext symbol is mapped to a corresponding ciphertext symbol. When using an RPPC to encode a plaintext symbol, a single language is used (though different languages may be used for encoding different plaintext symbols). The mapping is performed by using the permutation and partition for that single language and, optionally, one or more random numbers obtained from any suitable source(s) of randomness. To map a plaintext symbol to a ciphertext symbol, first the plaintext symbol is used to identify a particular subset in the partition of the permutation at act 1104. If there is only one ciphertext symbol in the particular subset, that is the ciphertext symbol to which the plaintext symbol is mapped. If there are multiple ciphertext symbols in the particular subset, then one of them is selected at random, at act 1106.

The selected ciphertext symbol is output at act 1108. For example, the ciphertext symbol may be transmitted via a communication channel (e.g., such as illustrative communication channel 130 of FIG. 1) to another device or stored.

In some embodiments, process 1100 may be repeated any suitable number of times to complete encryption of a desired number of plaintext symbols (which may represent a portion or all of an input message, information identifying one or more operations performed by an encryption device, a salt value, new parameter values for one or more control parameters of an encryption device, etc.). In some embodiments, the same language may be used to encode multiple plaintext symbols. In some embodiments, different plaintext symbols may be encoded using different languages (e.g., different ciphertext symbols, different permutations, different partitions, etc.). A new language may be selected for encrypting each plaintext symbol, after encrypting a threshold number of plaintext symbols, or after encrypting a random number of plaintext symbols (e.g., after a number of symbols selected from a discrete probability distribution having one or more desired moments, such as the Poisson distribution for example).

Figure 11B:
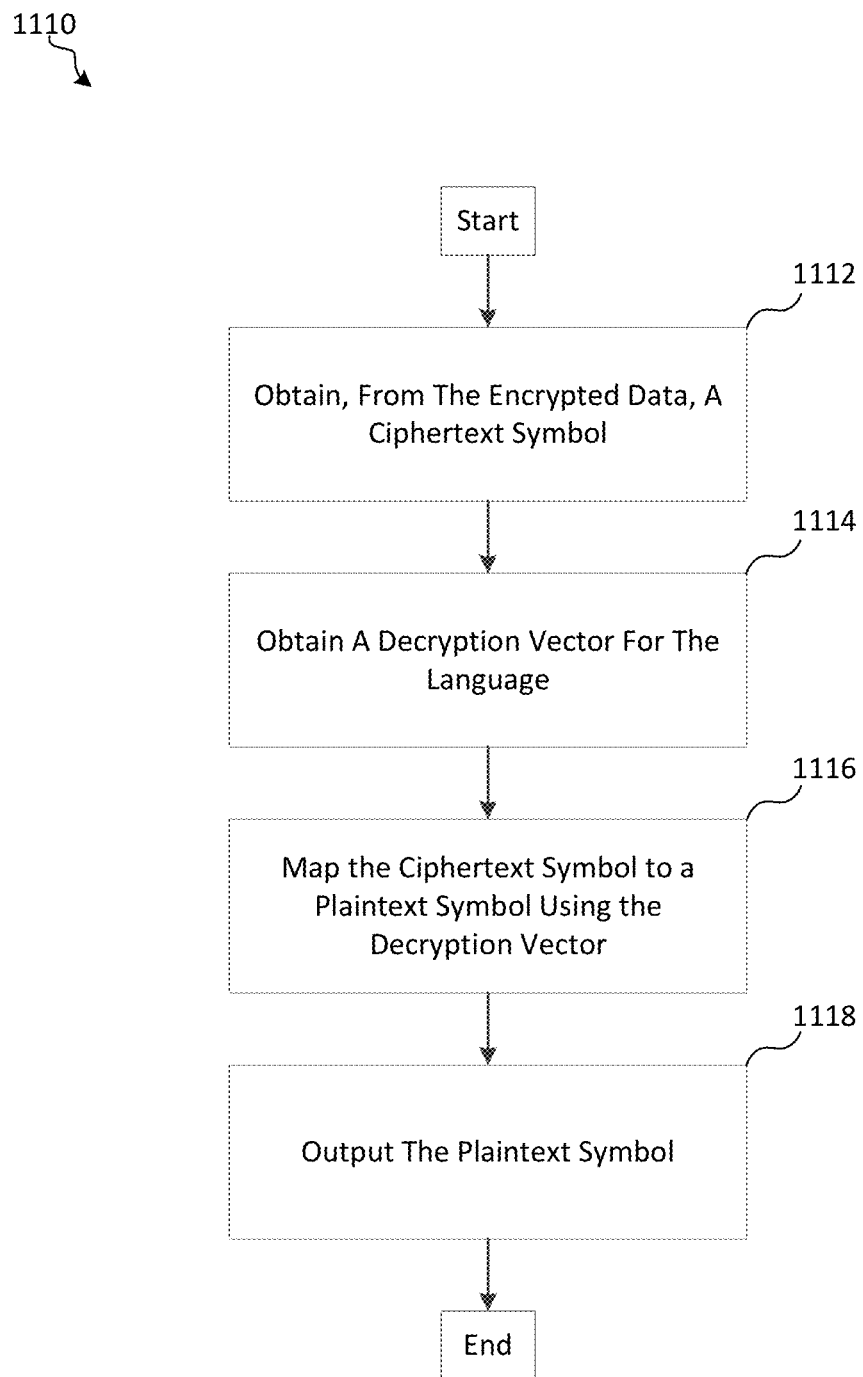
FIG. 11B shows an illustrative process 1110 for decrypting data that was encrypted using an RPPC, in accordance with some embodiments of the technology described herein.

FIG. 11B shows an illustrative process 1110 for decrypting ciphertext using an RPPC, according to some embodiments. Process 1110, for example, may be implemented in decryption module 1024 of FIG. 10 and run on any suitable computing device, such as computing device 1300 of FIG. 13. In some embodiments, the process 1110 may be performed by hardware (e.g., using an ASIC, an FPGA, or any other suitable circuitry), software (e.g., by executing the software using a computer processor), or any suitable combination thereof.

In some embodiments, process 1110 may be a method for decrypting data encrypted by an RPPC such as described in process 1100 of FIG. 11A. For example, the encrypted data may be encrypted using a cipher associated with a plurality of languages, each language of the plurality of languages being associated with a respective set of ciphertext symbols, a permutation for the first set of ciphertext symbols, and a partitions for the permutation.

Process 1100 begins at act 1112, where a first ciphertext symbol is obtained from encrypted data. The encrypted data may be received over a communication channel (e.g., from a transmitter device such as an encoding device 110) or accessed from memory.

Next, at act 1114, a decryption vector may be obtained for the language. The decryption vector may be received over a communication channel, computed from information about the language (e.g., from information about the ciphertext symbols (active), permutation, and partition for the language), or accessed from memory.

Next, at act 1116, the ciphertext symbol is mapped to a plaintext symbol using the decryption vector. The decryption vector may define the mapping from ciphertext symbols to plaintext symbols, as described by the permutation of the set of ciphertext symbols and the partition of the permutation. The decryption device may use the decryption vector to convert the ciphertext symbol to a plaintext symbol in accordance with the permutation of the set of ciphertext symbols and the partition of the permutation. An example is provided below.

In act 1118, the plaintext symbol may be output by the cipher. In some embodiments, outputting the plaintext symbol may mean, for example, displaying the symbol to a user on a display, storing the symbol, or providing the plaintext symbol to another software program.

As an example of performing encryption and decryption using processes 1100 and 1110, consider the first set of ciphertext symbols to be: [0 1 2 3 4 5 6 7 8 9 10 11 12 13 14 15]. As above, the permutation of the first set of ciphertext symbols may be: [13 4 3 8 6 12 10 5 7 15 2 11 0 9 14 1], wherein only the first 12 ciphertext symbols have been selected as active (e.g., usable for representing plaintext symbols): [13 4 3 8 6 12 10 5 7 15 2 11 0 9 14 1]. A partition may be formed of the permutation such that there are four subsets of three ciphertext symbols each: [13 4 3|8 6 12|10 5 7|15 2 11].

Now suppose we wish to encode four plaintext symbols "A", "B", "C", or "D". Encoding "A" involves identifying one of the subsets in the partition to correspond to "A"—say {13 4 3}—and then randomly selecting one of the symbols in that partition to represent "A". Thus any one of the symbols "13" or "4" or "3" may be used to represent "A", and each of these symbols may be chosen at random (using any suitable source of randomness) such that different occurrences of the plaintext symbol "A" may be mapped to different ciphertext symbols. Similarly, "B" may be mapped to one of the ciphertext symbols in the second subset {8 6 12}, "C" may be mapped to one of the ciphertext symbols in the third subset {10 5 7} and "D" may be mapped to one of the ciphertext symbols in the fourth subset {15 2 11}.

In this example, the decryption vector would indicate which ciphertext symbols are possible representations for a plaintext symbol. Thus, when the decryption device receives any one of the ciphertext symbols 13, 4, or 3, it may use the decryption vector to decrypt the ciphertext symbol and output the plaintext symbol "A." In some embodiments, the decryption vector may also indicate the inactive ciphertext symbols 0, 9, 14, and 1, if the decryption device receives any of the inactive symbols 0, 9, 14, or 1, this may facilitate detection of tampering.

In the above example, there are 16 ciphertext symbols and 4 plaintext symbols, but it should be appreciated any suitable number of ciphertext symbols and plaintext symbols may be used in encryption process 1100, as the above example is merely illustrative. As another non-limiting example, there may be 32 plaintext symbols and 256 ciphertext symbols. Additionally, while the plaintext and ciphertext symbols comprise alphanumeric symbols in this example, the plaintext and ciphertext symbols may include any suitable symbols including but not limited to alphanumeric symbols (e.g., punctuation symbols, mathematical symbols, Greek symbols, etc.).

While the partition in above-described example has a subset comprising 4 inactive symbols, in some embodiments, the number of inactive symbols may be different. For example, there may be zero inactive symbols, to improve secrecy of the cipher. Alternately, there may be the same number of inactive and active symbols, to facilitate testing for tampering. Additionally, in some embodiments, the subsets of the partition may not include an equal number of ciphertext symbols, as is the case in the above-described example.

Figure 12A:
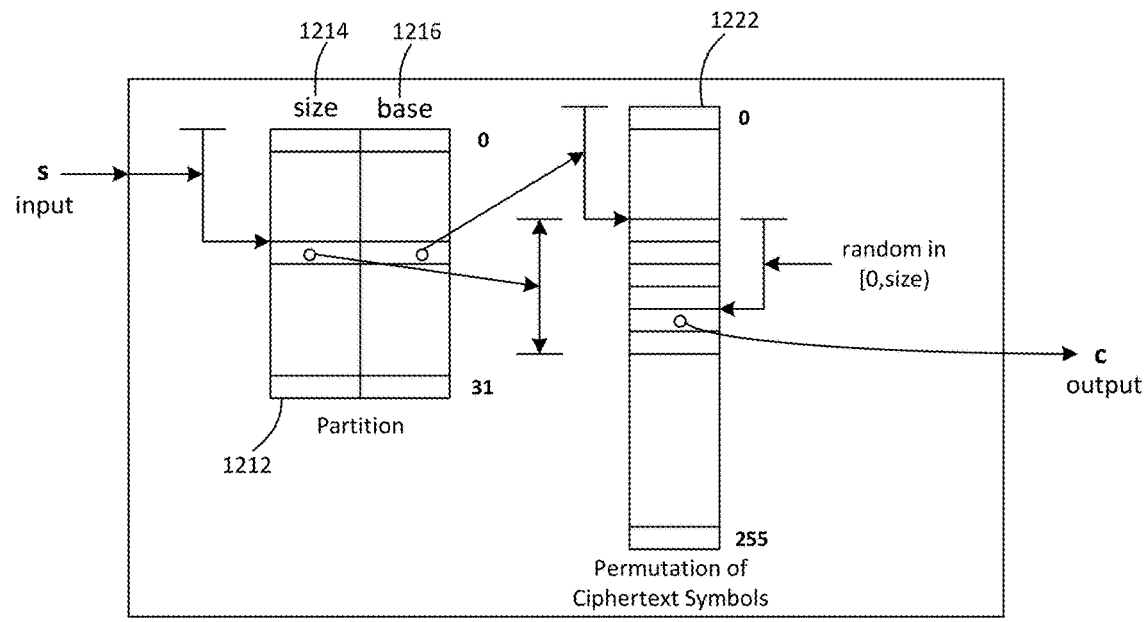
FIG. 12A shows using an RPPC, with a selected language, to encrypt a plaintext symbol to obtain a corresponding ciphertext symbol, in accordance with some embodiments of the technology described herein.

FIG. 12A shows a schematic illustration of using an RPPC to encrypt data, according to some embodiments. The example of FIG. 12A may be an implementation of acts 1114 and 1116 of FIG. 11A, in which an input plaintext symbol s may be mapped to an output ciphertext symbol c. In some embodiments, the encryption may be performed by hardware (e.g., using an ASIC, an FPGA, or any other suitable circuitry), software (e.g., by executing the software using a computer processor), or any suitable combination thereof.

FIG. 12A illustrates, for a single language, a corresponding partition 1212 of the permutation of a set of ciphertext symbols 1222. In this example, permutation 1222 is a permutation of the set of 256 ciphertext symbols, and the partition 1212 includes 32 subsets.

In this example, the partition 1212 is represented by a data structure having multiple pairs of values called "size" and "base". Each (size, base) pair identifies a specific subset of the partition. In other words, the partition has multiple subsets, but each subset may be identified using a pair of values (size, base) in this implementation (which assumes, for clarity, that elements of the permutation are stored in a linear order and that each subset of the partition includes a contiguous set of elements). The "size" 1214 indicates the number of elements in the subset of the partition. The "base" 1216 indicates the location of the first element in the subset of the partition (e.g., in an implementation where the permuted symbols are stored in an array).

Thus, when mapping a plaintext symbol s to a ciphertext symbol c, the plaintext symbol s may be used as an index of the partition, selecting a corresponding pair (size, base). A random number may then be selected (e.g., by a random number generator or any other suitable entropy source) to identify a ciphertext symbol from among the elements in the subset of the partition identified by the selected (size, base) pair. If the ciphertext symbols in the subset of the partition are contiguous, then the random number can be used to select one of the elements to represent the plaintext symbol.

Figure 12B:
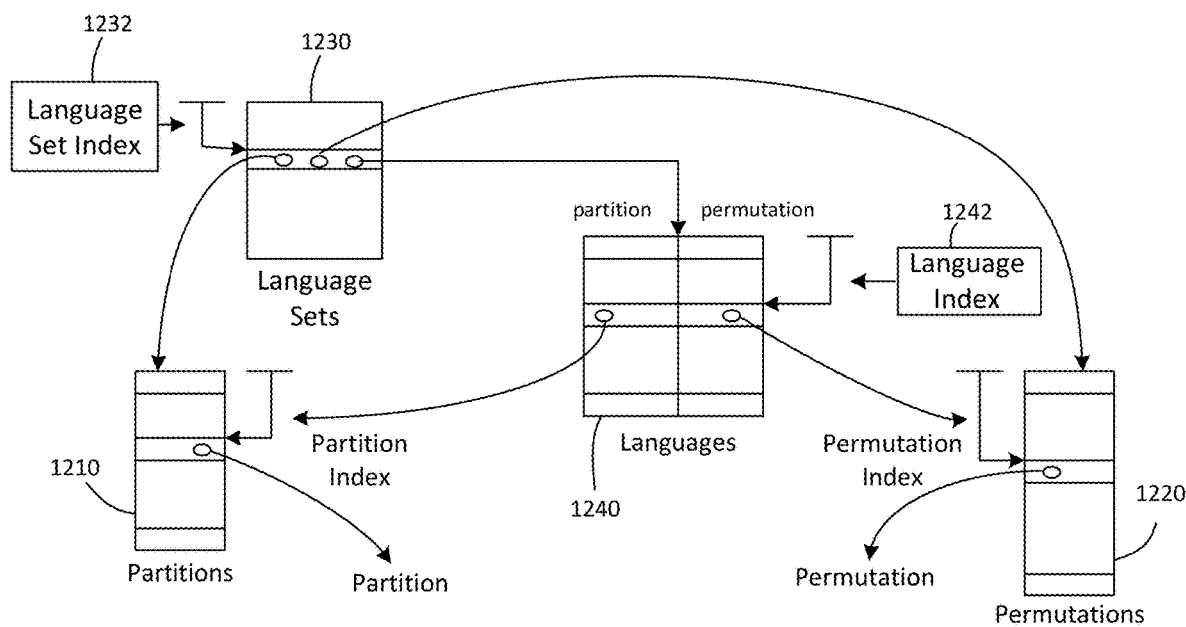
FIG. 12B illustrates selecting a language to use for encrypting data using an RPPC, in accordance with some embodiments of the technology described herein.

FIG. 12B shows a schematic illustration of a process of selecting a language and an associated permutation and partition for encryption, according to some embodiments. In some embodiments, language set index 1232 may obtain a random value from one or more sources of randomness. The random value may be used as an index to select a language from among languages 1240 in the language sets 1230.

In some embodiments, language index 1242 may also obtain a random value from one or more entropy sources (e.g., a random number generator, or any other suitable entropy source). The random value selected by language index 1242 may index the languages 1240 to select a specific partition 1212 and a permutation 1222, as described in FIG. 12A.

Figure 12C:
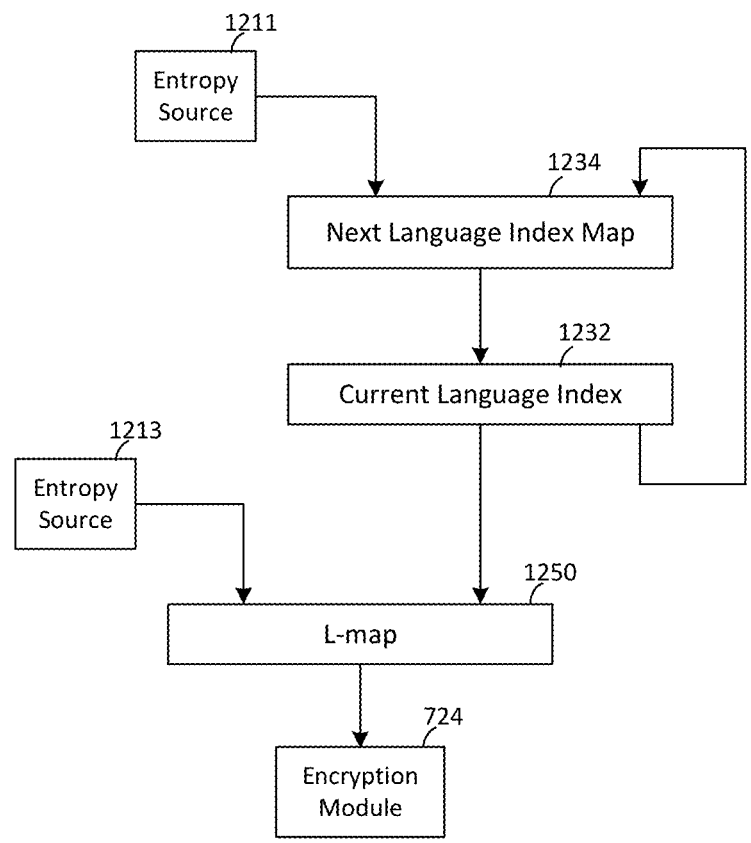
FIG. 12C shows an illustrative transformation of a language, in accordance with some embodiments of the technology described herein.

To reduce a potential eavesdropper's (e.g., Eve of FIG. 1) ability to determine which language is being used and/or how plaintext symbols are being mapped to ciphertext symbols, the language selection may be passed through a transformation. FIG. 12C shows a schematic illustration of passing a language through a transformation prior to the language being used by encryption module 724, in accordance with some embodiments.

In some embodiments, next language index map 1234 may use a random value from one or more entropy sources 1211 to select a next language for encryption. Entropy source 1211 may include harvested entropy from a history buffer (e.g., illustrative history buffer 720 of FIG. 7) and/or injected entropy, whereby injected entropy is entropy created by a random source in the encryption device and distributed to the decryption device by use of a command. The random value may be combined with a value of the current language index 1232 to select a next language for encryption. The next language index map 1234 may write this language to the current language index 1232.

In some embodiments, the current language index 1232 may send the current language index to L-map 1250. L-map 1250 may perform a transformation similar to S-map 708 and/or O-map 725 of FIG. 7. L-map 1250 may receive input from entropy source 1213, which may include one or more of harvested entropy from a history buffer (e.g., illustrative history buffer 720 of FIG. 7) and/or injected entropy. Entropy source 1213 may be the same or different from entropy source 1211. L-map 1250 may then send the transformed language index to the encryption module 724 for use in encryption.

Figure 12D:
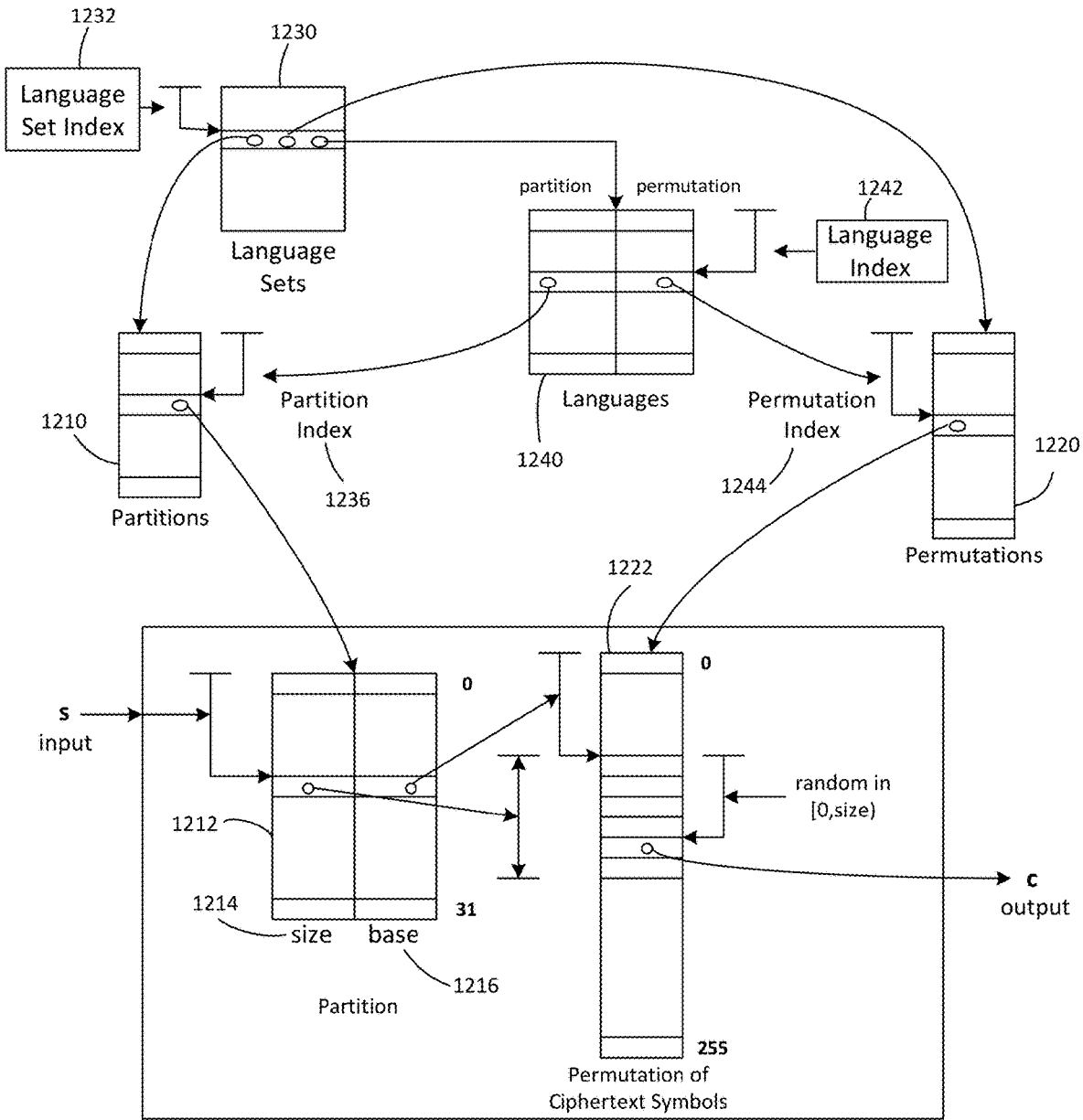
FIG. 12D illustrates using an RPPC to perform encryption, in accordance with some embodiments of the technology described herein.

FIG. 12D shows a schematic illustration of an RPPC system including a method of selecting a language using randomly-generated values and a method of mapping plaintext symbols to ciphertext symbols, according to some embodiments. This illustrative system may be implemented, for example, in encryption module 724 of FIG. 7.

In some embodiments, language set index 1232 may be used to select languages 1240 from the language sets 1230. The languages 1240 may comprise one or more permutations 1220 of a set of ciphertext symbols and one or more partitions 1210 of each permutation 1220. The language index 1242 may be used to select permutations 1220 and partitions 1210 of the permutations 1220. A partition index 1236 may select a specific partition 1212, and a permutation index 1244 may select a specific permutation of a set of ciphertext symbols 1222 for use in mapping a plaintext symbol s to a ciphertext symbol c. The selected languages 1240 and/or permutation 1222 and partition 1212 may be passed through L-map 1250, as described in reference to FIG. 12C.

In some embodiments, selecting a language may occur between one or more instances of mapping a plaintext symbol to a ciphertext symbol. In some implementations, a new language may be selected between each instance of a mapping of a plaintext symbol to a ciphertext symbol. A new language may be selected periodically between instances of mapping a plaintext symbol to a ciphertext symbol. Alternately, a new language may be selected at random intervals between instances of mapping a plaintext symbol to a ciphertext symbol.

In some embodiments, after a language is selected, it may be used to map a plaintext symbol s to a ciphertext symbol c using the selected permutation of a set of ciphertext symbols 1222 and partition 1212. When mapping a plaintext symbol s to a ciphertext symbol c, the plaintext symbol s may be used as an index of the partition, selecting the size 1214 and base 1216 in the permutation for mapping. A random number may then be selected (e.g., by a random number generator) within the size 1214 of the subset of the permutation. The random number may then be used to index the permutation from the base 1216 within the size 1214 of the subset. The ciphertext symbol c located at the indexed location may then be output.

Figure 12E:
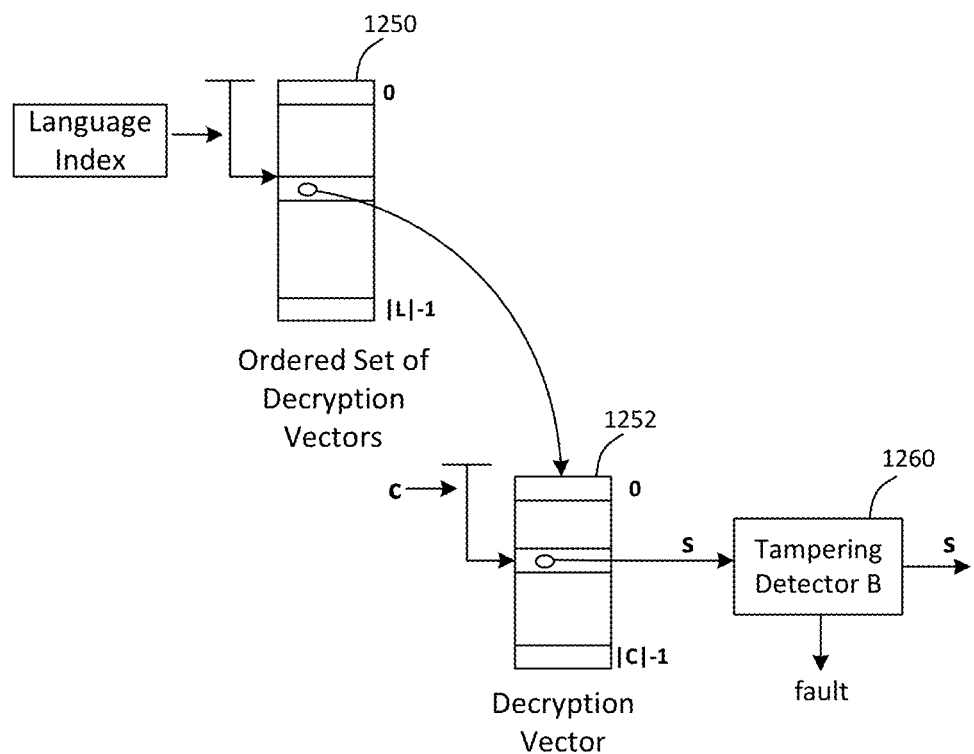
FIG. 12E illustrates generating a decryption vector for use in decrypting ciphertext obtained using an RPPC, in accordance with some embodiments of the technology described herein.

FIG. 12E shows a schematic illustration of selecting and using a decryption vector for decryption using an RPPC, in accordance with some embodiments of the technology described herein. The example of FIG. 12E may be implemented in the decryption module 1024 of FIG. 10.

In some embodiments, language index 1242 may index the ordered sets of decryption vectors 1250 to select a decryption vector 1252. The ordered sets of decryption vectors 1250 may contain a number of decryption vectors equal to the number of languages. When a ciphertext symbol c reaches the decryption module, it may be mapped to a plaintext symbol s using the selected decryption vector 1252. The ciphertext symbol c may be used to index the decryption vector 1252, such that the corresponding plaintext symbol s is located at the indexed location within the decryption vector 1252. Then, the plaintext symbol s may be output from the decryption vector.

In some embodiments, the output plaintext symbol s may be passed to tampering detector 1260. Tampering detector 1260 may be configured to identify if any output plaintext symbols s from decryption vector 1252 are inactive, indicating external tampering. Tampering detector 1260 may be configured to output an indication of a fault or error when it encounters an inactive plaintext symbol s. When tampering detector 1260 encounters an active plaintext symbol s, it may pass on the plaintext symbol s to the decryption device.

Figure 13:
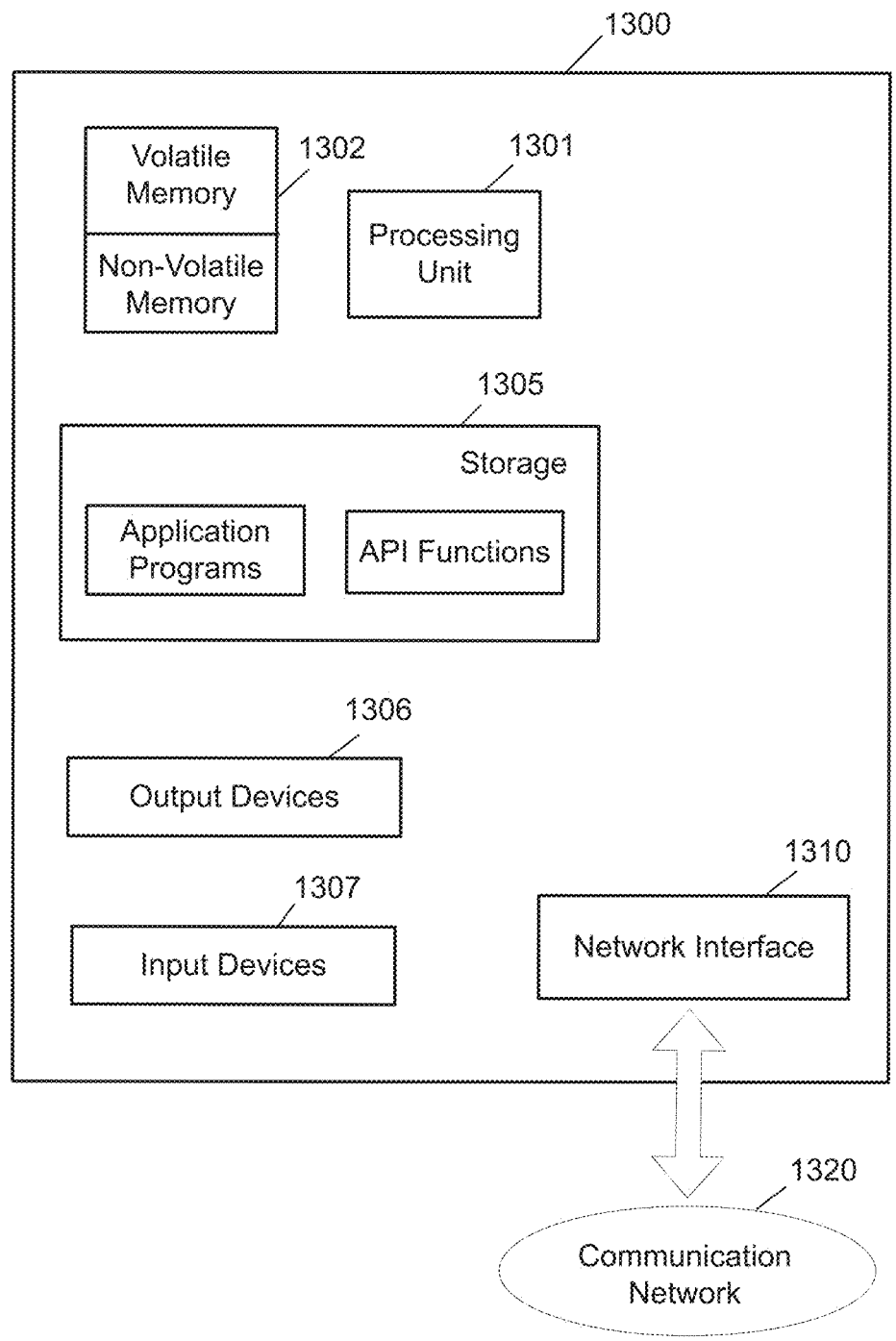
FIG. 13 shows, schematically, an illustrative computer 1300 on which any aspect of the technology described herein may be implemented.

FIG. 13 shows, schematically, an illustrative computer 1300 on which any aspect of the present disclosure may be implemented.

In the embodiment shown in FIG. 13, the computer 1300 includes a processing unit 1301 having one or more processors and a non-transitory computer-readable storage medium 1302 that may include, for example, volatile and/or non-volatile memory. The memory 1302 may store one or more instructions to program the processing unit 1301 to perform any of the functions described herein. The computer 1300 may also include other types of non-transitory computer-readable medium, such as storage 1305 (e.g., one or more disk drives) in addition to the system memory 1302. The storage 1305 may also store one or more application programs and/or resources used by application programs (e.g., software libraries), which may be loaded into the memory 1302.

The computer 1300 may have one or more input devices and/or output devices, such as devices 1306 and 1307 illustrated in FIG. 13. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards and pointing devices, such as mice, touch pads, and digitizing tablets. As another example, the input devices 1307 may include a microphone for capturing audio signals, and the output devices 1306 may include a display screen for visually rendering, and/or a speaker for audibly rendering, recognized text. As another example, the input devices 1307 may include sensors (e.g., electrodes in a pacemaker), and the output devices 1306 may include a device configured to interpret and/or render signals collected by the sensors (e.g., a device configured to generate an electrocardiogram based on signals collected by the electrodes in the pacemaker).

As shown in FIG. 13, the computer 1300 may also comprise one or more network interfaces (e.g., the network interface 1310) to enable communication via various networks (e.g., the network 1320). Examples of networks include a local area network or a wide area network, such as an enterprise network or the Internet. Such networks may be based on any suitable technology and may operate according to any suitable protocol and may include wireless networks, wired networks or fiber optic networks. Such networks may include analog and/or digital networks.

Having thus described several aspects of at least one embodiment, it is to be appreciated that various alterations, modifications, and improvements will readily occur to those skilled in the art. Such alterations, modifications, and improvements are intended to be within the spirit and scope of the present disclosure. Accordingly, the foregoing description and drawings are by way of example only.

The above-described embodiments of the present disclosure can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Also, the various methods or processes outlined herein may be coded as software that is executable on one or more processors that employ any one of a variety of operating systems or platforms. However, it should be appreciated that aspects of the present disclosure are not limited to using an operating system. Additionally, such software may be written using any of a number of suitable programming languages and/or programming or scripting tools, and also may be compiled as executable machine language code or intermediate code that is executed on a framework or virtual machine.

In this respect, the concepts disclosed herein may be embodied as a non-transitory computer-readable medium (or multiple computer-readable media) (e.g., a computer memory, one or more floppy discs, compact discs, optical discs, magnetic tapes, flash memories, circuit configurations in Field Programmable Gate Arrays or other semiconductor devices, or other non-transitory, tangible computer storage medium) encoded with one or more programs that, when executed on one or more computers or other processors, perform methods that implement the various embodiments of the present disclosure discussed above. The computer-readable medium or media may be transportable, such that the program or programs stored thereon can be loaded onto one or more different computers or other processors to implement various aspects of the present disclosure as discussed above.

The terms "program" or "software" are used herein to refer to any type of computer code or set of computer-executable instructions that can be employed to program a computer or other processor to implement various aspects of the present disclosure as discussed above. Additionally, it should be appreciated that according to one aspect of this embodiment, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various features and aspects of the present disclosure may be used alone, in any combination of two or more, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the concepts disclosed herein may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

The terms "approximately" and "about" may be used to mean within ±20% of a target value in some embodiments, within ±10% of a target value in some embodiments, within ±5% of a target value in some embodiments, within ±2% of a target value in some embodiments. The terms "approximately" and "about" may include the target value.

Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

What is claimed is:

1. A method for encrypting input data using a cipher associated with a plurality of languages including a first language, the first language associated with a first set of ciphertext symbols, a first permutation for the first set of ciphertext symbols, and a first partition for the first permutation, the method comprising:
using at least one processor to perform:
obtaining, from the input data, a first plaintext symbol;
mapping the first plaintext symbol to a first ciphertext symbol using the cipher, the mapping comprising:
identifying a first set of candidate ciphertext symbols using the first plaintext symbol, the first permutation, and the first partition; and
identifying, at random, the first ciphertext symbol from the first set of candidate ciphertext symbols; and
outputting the first ciphertext symbol,
wherein the method further comprises selecting the first language from the plurality of languages before mapping the first plaintext symbol to the first ciphertext symbol, wherein selecting the first language comprises:
generating the first permutation for the first set of ciphertext symbols using one or more sources of randomness; and
generating the first partition for the first permutation, and
wherein generating the first partition for the first permutation comprises:
identifying a set of active ciphertext symbols among the first set of ciphertext symbols; and
identifying, as the first partition, multiple mutually disjoint proper subsets of the set of active ciphertext symbols, wherein the multiple mutually disjoint proper subsets cover the set of active ciphertext symbols.

2. The method of claim 1, wherein selecting the first language further comprises:
generating a first decryption vector using the first permutation and the first partition.

3. The method of claim 1, further comprising:
using a decryption vector, mapping the first ciphertext symbol to the first plaintext symbol; and
outputting the first plaintext symbol.

4. The method of claim 1, wherein the first partition comprises multiple mutually disjoint proper subsets of the first set of ciphertext symbols, and wherein each of the multiple mutually disjoint proper subsets contains a same number of ciphertext symbols.

5. The method of claim 1, wherein the first partition comprises multiple mutually disjoint proper subsets of the first set of ciphertext symbols, and wherein at least two of the multiple mutually disjoint proper subsets contain a different number of ciphertext symbols.

6. The method of claim 1, wherein outputting the first ciphertext symbol comprises transmitting the first ciphertext symbol to another device using a communication channel.

7. The method of claim 1, wherein outputting the first ciphertext symbol comprises storing the first ciphertext symbol.

8. The method of claim 1, wherein the method comprises:
when using the first language for mapping plaintext symbols to respective ciphertext symbols,
mapping each of the plaintext symbols, including the first plaintext symbol, to respective ciphertext symbols only in a proper subset of the first set of ciphertext symbols.

9. A method for encrypting input data using a cipher associated with a plurality of languages including a first language, the first language associated with a first set of ciphertext symbols, a first permutation for the first set of ciphertext symbols, and a first partition for the first permutation, wherein the plurality of languages includes a second language associated with the first set of ciphertext symbols, a second permutation for the first set of ciphertext symbols and different from the first permutation, and a second partition for the first permutation, the method comprising:
using at least one processor to perform:
obtaining, from the input data, a first plaintext symbol;
mapping the first plaintext symbol to a first ciphertext symbol using the cipher, the mapping comprising:
identifying a first set of candidate ciphertext symbols using the first plaintext symbol, the first permutation, and the first partition; and
identifying, at random, the first ciphertext symbol from the first set of candidate ciphertext symbols;
obtaining, from the input data, a second plaintext symbol;
mapping the second plaintext symbol to a second ciphertext symbol using the randomized partitioned permutation cipher, the mapping comprising:
identifying a second set of candidate ciphertext symbols using the second plaintext symbol, the second permutation, and the second partition;
identifying, at random, the second ciphertext symbol from the second set of candidate ciphertext symbols; and
outputting the first ciphertext symbol and the second ciphertext symbol.

10. The method of claim 9, wherein after outputting the first ciphertext symbol and before mapping the second plaintext symbol to a second ciphertext symbol, the method further comprising selecting the second language from the plurality of languages.

11. The method of claim 9, wherein the first partition comprises multiple mutually disjoint proper subsets of the first set of ciphertext symbols, and wherein each of the multiple mutually disjoint proper subsets contains a same number of ciphertext symbols.

12. The method of claim 9, wherein the first partition comprises multiple mutually disjoint proper subsets of the first set of ciphertext symbols, and wherein at least two of the multiple mutually disjoint proper subsets contain a different number of ciphertext symbols.

13. The method of claim 9, wherein outputting the first ciphertext symbol comprises transmitting the first ciphertext symbol to another device using a communication channel.

14. The method of claim 9, wherein outputting the first ciphertext symbol comprises storing the first ciphertext symbol.

15. The method of claim 9, wherein the method comprises:
when using the first language for mapping plaintext symbols to respective ciphertext symbols,
mapping each of the plaintext symbols, including the first plaintext symbol, to respective ciphertext symbols only in a proper subset of the first set of ciphertext symbols.

16. A system, comprising:
at least one computer hardware processor; and
at least one non-transitory computer-readable storage medium storing processor-executable instructions that, when executed by at least one computing device, cause the at least one computing device to perform a method for encrypting input data using a cipher associated with a plurality of languages including a first language, the first language associated with a first set of ciphertext symbols, a first permutation for the first set of ciphertext symbols, and a first partition for the first permutation, and the plurality of languages includes a second language associated with the first set of ciphertext symbols, a second permutation for the first set of ciphertext symbols and different from the first permutation, and a second partition for the first permutation, the method comprising:
using the at least one computer hardware processor to perform:
obtaining, from the input data, a first plaintext symbol;
mapping the first plaintext symbol to a first ciphertext symbol using the cipher, the mapping comprising:
identifying a first set of candidate ciphertext symbols using the first plaintext symbol, the first permutation, and the first partition; and identifying, at random, the first ciphertext symbol from the first set of candidate ciphertext symbols; and outputting the first ciphertext symbol obtaining, from the input data, a second plaintext symbol;

mapping the second plaintext symbol to a second ciphertext symbol using the randomized partitioned permutation cipher, the mapping comprising:

identifying a second set of candidate ciphertext symbols using the second plaintext symbol, the second permutation, and the second partition;

identifying, at random, the second ciphertext symbol from the second set of candidate ciphertext symbols; and outputting the second ciphertext symbol.

* * * * *